(12) United States Patent
Krishnamurthy

(10) Patent No.: US 10,528,665 B2
(45) Date of Patent: Jan. 7, 2020

(54) SYSTEM AND METHOD FOR NATURAL LANGUAGE GENERATION

(71) Applicant: Satyanarayana Krishnamurthy, Bangalore (IN)

(72) Inventor: Satyanarayana Krishnamurthy, Bangalore (IN)

( * ) Notice: Subject to any disclaimer, the term of this patent is extended or adjusted under 35 U.S.C. 154(b) by 131 days.

(21) Appl. No.: 15/520,608

(22) PCT Filed: Mar. 8, 2017

(86) PCT No.: PCT/IN2017/050085
§ 371 (c)(1),
(2) Date: Apr. 20, 2017

(87) PCT Pub. No.: WO2018/131048
PCT Pub. Date: Jul. 19, 2018

(65) Prior Publication Data
US 2018/0300311 A1 Oct. 18, 2018

(51) Int. Cl.
*G06F 17/28* (2006.01)
*G06F 17/27* (2006.01)

(52) U.S. Cl.
CPC ........ *G06F 17/2785* (2013.01); *G06F 17/274* (2013.01); *G06F 17/2881* (2013.01)

(58) Field of Classification Search
CPC .............. G06F 17/289; G06F 17/2785; G06F 17/30864; G06F 17/30707; G06F 17/30067; G06F 7/24; G06F 17/2881
See application file for complete search history.

(56) References Cited

U.S. PATENT DOCUMENTS

| 5,715,468 | A * | 2/1998 | Budzinski | G06F 17/27 704/9 |
| 6,721,697 | B1 * | 4/2004 | Duan | G06F 17/277 704/2 |
| 7,167,824 | B2 * | 1/2007 | Kallulli | G10L 13/02 704/8 |
| 7,231,341 | B2 * | 6/2007 | Bangalore | G06F 17/271 704/1 |
| 7,496,621 | B2 * | 2/2009 | Pan | G06F 17/2785 704/1 |

(Continued)

*Primary Examiner* — Jialong He
(74) *Attorney, Agent, or Firm* — Symbus Law Group, LLC; Clifford D. Hyra

(57) ABSTRACT

The system includes receiving one or more semantic items and a language object corresponding to the language in which the text is to be generated. The system further includes identifying one or more sentence types and one or more sentence part types for each identified sentence type. The system includes obtaining a vocabulary class for the each identified sentence part type by querying the word to sentence part type association rule, obtains one or more vocabulary class features for each of the sentence part type by querying the word to sentence part type association rule. The system further includes creating and building a natural language phrase object for each sentence part type. The system further includes deriving an expression for each built natural language phrase object. The System further includes arranging sequentially all the derived expressions using a word separation character between every pair of successive expressions.

14 Claims, 7 Drawing Sheets

(56) References Cited

U.S. PATENT DOCUMENTS

| | | | |
|---|---|---|---|
| 7,930,169 B2* | 4/2011 | Billerey-Mosier | ............................ G06Q 10/087 704/4 |
| 9,852,337 B1* | 12/2017 | van Rotterdam | .. G06K 9/00483 |
| 2006/0004563 A1* | 1/2006 | Campbell | ............. G06F 17/271 704/9 |
| 2008/0235199 A1* | 9/2008 | Li | ........................ G06F 16/243 |
| 2009/0077113 A1* | 3/2009 | Fidaali | ................ G06F 17/2705 |
| 2010/0287162 A1* | 11/2010 | Shirwadkar | ......... G06F 17/2785 707/740 |
| 2011/0184718 A1* | 7/2011 | Chen | ..................... G06F 17/274 704/2 |
| 2014/0040312 A1* | 2/2014 | Gorman | .............. G06F 17/2785 707/771 |
| 2014/0316768 A1* | 10/2014 | Khandekar | ....... G06F 17/30654 704/9 |
| 2014/0351228 A1* | 11/2014 | Yamamoto | ............ G06F 17/279 707/692 |
| 2015/0186504 A1* | 7/2015 | Gorman | .............. G06F 17/2705 707/752 |
| 2015/0261745 A1* | 9/2015 | Song | .................... G06F 17/2881 704/9 |
| 2016/0048504 A1* | 2/2016 | Narayanan | .......... G06F 17/2755 704/9 |
| 2016/0364377 A1* | 12/2016 | Krishnamurthy | ..... G06F 17/271 |
| 2017/0024462 A1* | 1/2017 | Allen | ................ G06F 17/30684 |
| 2017/0161372 A1* | 6/2017 | Fernández | ............ G06F 17/218 |
| 2017/0242915 A1* | 8/2017 | Torisawa | ................. G06F 17/30 |
| 2017/0337180 A1* | 11/2017 | Wang | ..................... G06F 17/274 |
| 2018/0011830 A1* | 1/2018 | Iida et al. | ............. G06F 17/241 |
| 2018/0060302 A1* | 3/2018 | Liang | .................... G06F 17/277 |
| 2018/0089382 A1* | 3/2018 | Allen | .................... G06F 17/274 |
| 2018/0173698 A1* | 6/2018 | Dubey | ................. G06F 17/3069 |
| 2018/0174020 A1* | 6/2018 | Wu | ......................... G06N 3/006 |
| 2018/0225259 A1* | 8/2018 | Alba | ........................ G06F 17/24 |

* cited by examiner

SYSTEM AND METHOD FOR NATURAL LANGUAGE GENERATION

FIELD OF THE INVENTION

The present invention relates to the concept of natural language generation and more particularly to a method and a system for computers to generate textual descriptions in natural languages for input chunks of knowledge.

BACKGROUND

Natural languages evolved to document and communicate human experiences and thoughts. Natural languages have both visual and auditory forms. Natural languages have evolved to support physical aspects of human experiences in the external world and conceptual aspects of human thoughts in the internal world of the human mind. Natural languages have also evolved to support rich expressiveness and economy of expression. Rich expressiveness and economy of expression combine to promote high semantic density in communication. Another feature of human communication in the real world is termed as semantic compounding. Semantic compounding emphasizes or highlights the significance of what is conveyed in an utterance. Often such an utterance is compounded with another utterance. The compounding second utterance may relate to conditionality, cause and effect, concurrency, presence of contrary, contradictory or unfavourable circumstances, etc. Natural language utterances involve a combinatorial explosion driven by semantic context. Semantic compounding and combinatorial explosion cannot be adequately captured in grammar representations. Natural languages have also evolved to support an imprecise or impressionistic description where such a description is adequate to implicitly infer a more precise meaning of the description based on knowledge about a population of objects in the context of the description. Semantics is the core of natural language utterances and is largely experiential. Therefore, semantics constitutes a major reason for the limited success achieved in processing of natural language utterances by computer programs.

Use of grammar in natural languages typically involves syntax which implies a specified sequence or an order in which words are to be used to make up a valid utterance or a valid sentence. However, natural languages typically do not enforce a rigid or an inflexible syntax. For example, Sanskrit, an ancient language from India, is an open syntax (no prescribed word order at all) or a highly flexible language in that the words in an utterance in Sanskrit can, in most cases, occur in any order, and different utterances obtained by merely changing the order of the words are semantically equivalent. Most other natural languages are hybrids in that the order can be changed in parts of the syntax.

For ease of learning and ease of use, natural languages have evolved to support a derivation of new words from existing words. Different case, number, gender and tense forms are derived from base words. Adjectives are derived from nouns and nouns from adjectives; nouns and adjectives are derived from verbs; verbs from nouns and adverbs from adjectives, etc. Such a derivation happens, for example, by adding suffixes and prefixes and multiple ways of morphing words. Typically, every natural language has morphing rules. As natural languages originated for oral communication, ease of pronunciation and the need to be not harsh on the ears have played a part in shaping the morphing rules by contributing exceptions and sub rules. Natural languages have also evolved to support multiple communication needs. Natural languages may be used to describe a structure and a behaviour of objects and classes of objects, to describe actions and events, and for multiple ways of interpersonal interactions, for example, to command and to prescribe, to prohibit and to permit, to assert and to negate, to challenge and to defy, to forecast and to speculate, etc.

Natural language communications, typically, tend to have a small number of extended discourses with a marked level of semantic coherence. If and when a discourse context changes, the context switch is typically slow, gradual, and smooth, and is facilitated by connecting objects.

The main problems that arise in processing text in any natural language are analysis and understanding of sentences in the text, construction of sentences or natural language generation, conversion between visual and auditory forms, that is, text to speech conversion and vice versa, and translation from one natural language to another natural language. Natural language text processing typically involves three approaches, namely, algorithmic approach, statistical approach, and artificial neural network approach. The algorithmic approach is one of the earliest approaches and processes natural languages in a way similar to processing programming languages. That is, the algorithmic approach considers processing of natural language text as similar to processing computational problems solved by structured computer programs written in programming languages. The algorithmic approach has remained unexplored in contemporary work involving natural language processing owing to limited success achieved through it till present date. The reasons for the limited success are, for example, peculiarities of natural languages as compared to programming languages. The algorithmic approach has, in general, been inspired by or based on an approach used in parsing computer programs written in programming languages and uses the concept of a syntax tree or a parsing tree.

The statistical approach comprises building a model of a natural language from a large corpus of text in the natural language and applying the model so built in processing new text being added to the corpus. Although the statistical approach has been quite successful, it requires the deployment of substantial computing resources for substantial periods of time to study the large corpus and build an internal model separately for each natural language to be supported. Further, the model built statistically may be large in size, requiring a large runtime memory for processing. Moreover, the results of the statistical approach have a large number of errors initially and can improve only with time and usage. Furthermore, the statistical approach may not have an integrated approach to processing and generation, that is, reading of and writing in natural languages. Furthermore, per se, the statistical approach is not integrated with semantics.

The neural network approach uses artificial neural networks to process text. The neural network approach has been found to be successful in handling errors and omissions, for example, errors in spelling and construction of sentences, omissions of words, etc. However, techniques and technology involved in the neural network approach for text generation or natural language generation are less advanced than those for text processing. Technologies and tools available for natural language generation are domain specific.

Automation of natural language processing has three broad areas: Understanding natural language text (abridged as NLU), Speech Processing (comprising of: Speech recognition and speech to text conversion—abridged as STT and Text to Speech Conversion—abridged as TTS) and natural language text generation (abridged as NLG) either in spoken form or text form.

When a human speaks in a natural language or writes natural language text, he or she is encoding, in that natural language, a certain chunk of his or her own knowledge or world-view contained within his or her brain. That knowledge may have been acquired by direct use of the sense organs or by reading text in some natural language, which may have been different from the one in which speaking or writing is being done. In natural language text generation by a computer system, the objective is to generate text, in a specified natural language, that encodes a chunk from a repository of structured knowledge or information available to the computer system.

Significant progress has been achieved in the areas of NLU and Speech Processing. Comparable progress has not been achieved in the area of NLG. The text generation systems that have been invented and put to use are generally domain-specific, language-specific, limited in purpose (such as producing weather reports from weather-data) and have been template driven. There has been a long felt but unfulfilled need for a more versatile method and system for automated generation of textual descriptions of any knowledge encoded in a structured format. As a consequence, progress in the areas of machine translation and abstractive summarization has also not been realized to the desired extent. This patent application describes a method and system for template-less, domain-independent and language-neutral automated text generation, which can be put to use under a wide variety of situations. This invention enables a substantial advance in automatic abstractive summarization and machine translation capabilities.

SUMMARY

This summary is provided to introduce a selection of concepts, in a simple manner, which is further described in the detailed description of the invention. This summary is neither intended to identify key or essential inventive concepts of the subject matter, nor to determine the scope of the invention.

In one embodiment, a method and system for generating a text, based on one or more semantic items from a knowledge repository is disclosed wherein the system comprises, a processor, a memory communicatively coupled to the processor, a file system which, inter-alia, can contain the file that contains a structured description of the semantic items in the extensible mark-up language (xml), and a program stored in the memory for execution by the processor. Further the program is configured for, receiving one or more semantic items and a language object corresponding to the language in which the text is to be generated, identifying one or more sentence types for each received semantic item, based on the subtype of the semantic item and the structural content of the semantic item, identifying one or more sentence part types for the each identified sentence type, by querying the sentence type to sentence part type mappings in the language object, obtaining a vocabulary class for the each identified sentence part type by querying the word to sentence part type association rule, obtaining one or more vocabulary class features for each of the sentence part types by querying the word to sentence part type association rule; identifying, for each identified sentence part type, the corresponding one or more semantic items, either contained within the said each received semantic item or related to the said each received semantic item; deriving a word form or a phrase of multiple words, appropriate for the identified vocabulary class and vocabulary class features; generating a phrase to be used in the sentence to be generated, for the each sentence part type; generating one or more words using a word separation character; and arranging sequentially the generated words using a word separation character between every pair of successive words, in the order dictated by the position in sentence value in the wordFeatureValueSet for the sentence part type within the word to sentence part type association rule, to generate one or more sentences. The new text generation system consists of a grammar rule based model which is compact and requires a small runtime memory.

To further clarify the advantages and features of the present invention, a more particular description of the invention will follow by reference to specific embodiments thereof, which are illustrated in the appended figures. It is to be appreciated that these figures depict only typical embodiments of the invention and are therefore not to be considered limiting in scope. The invention will be described and explained with additional specificity and detail with the appended figures.

The method and the text generation system (TGS) disclosed herein addresses the above stated need for template-less, domain-independent and language-neutral generation of text encoding a set of semantic items from a repository of structured knowledge or information available to the system. The method and system disclosed herein can be used for a number of disparate applications comprising, for example, question-answering systems, conversation agents or chatbots, abstractive summarization, translation. The method disclosed herein employs the TGS comprising at least one processor configured to execute computer program instructions for processing structured information and generate text.

The text generation system (TGS) receives a semantic item set, from a knowledge repository that conforms to a comprehensive knowledge representation format provided, and a language object that conforms to a comprehensive language template provided. A semantic item in the received semantic item set may contain within itself connections to other semantic items in the knowledge repository and such other semantic items are referred to as connected semantic items. For each semantic item in the received semantic item set, the TGS identifies zero, one or more sentence type(s) to be used in text generation, from a comprehensive hierarchy of sentence types. For each identified sentence type, The TGS identifies, on the one hand, the connected semantic items to be used in text generation, and, on the other, the predefined set of sentence part types needed, which may have been, in part or whole, redefined in the language object, and the sequence, if any, in which those sentence part types should appear, predefined in the language object. For each identified sentence part type, the TGS identifies, on the one hand, semantic item(s) to be used in generating the phrase for that sentence part type, and, on the other, the needed predefined vocabulary class and the needed predefined vocabulary class features, which may be have been redefined in the language object. For each sentence part type, the TGS creates a phrase object. For each semantic item to be used in building the created phrase object, the TGS reads the root word corresponding to the received language object. Then the TGS uses such root word and builds the word-form corresponding to the identified vocabulary class and vocabulary class features, using the mechanisms and rules predefined in the received language object. Using these built word forms, the word association rules predefined in the received language object, and the word separation character predefined in the received language object, the TGS completely builds the created phrase for the sentence part type. The TGS then creates an ordered sequence of the built phrase objects corresponding to all the identified sentence parts: if a predefined sequence or order of sentence part types was identified, such sequence or order is used, else any random order is used. Then TGS generates the word sequence for each phrase using the word association rules predefined in the received language object and the word separator character predefined in the received language object. Finally TGS generates the sentence text for the identified sentence type by concatenating the generated word sequences using the word separation character, predefined in the received language object, between every pair of successive word sequences.

BRIEF DESCRIPTION OF DRAWINGS

The invention will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those skilled in the art having the benefit of the description herein.

DESCRIPTION OF THE INVENTION

For the purpose of promoting an understanding of the principles of the invention, reference will now be made to the embodiment illustrated in the figures and specific language will be used to describe them. It will nevertheless be understood that no limitation of the scope of the invention is thereby intended. Such alterations and further modifications in the illustrated system, and such further applications of the principles of the invention as would normally occur to those skilled in the art are to be construed as being within the scope of the present invention.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this invention belongs. The system, methods, and examples provided herein are only illustrative and not intended to be limiting.

Embodiments of the present invention will be described below in detail with reference to the accompanying figures.

Figure 1:
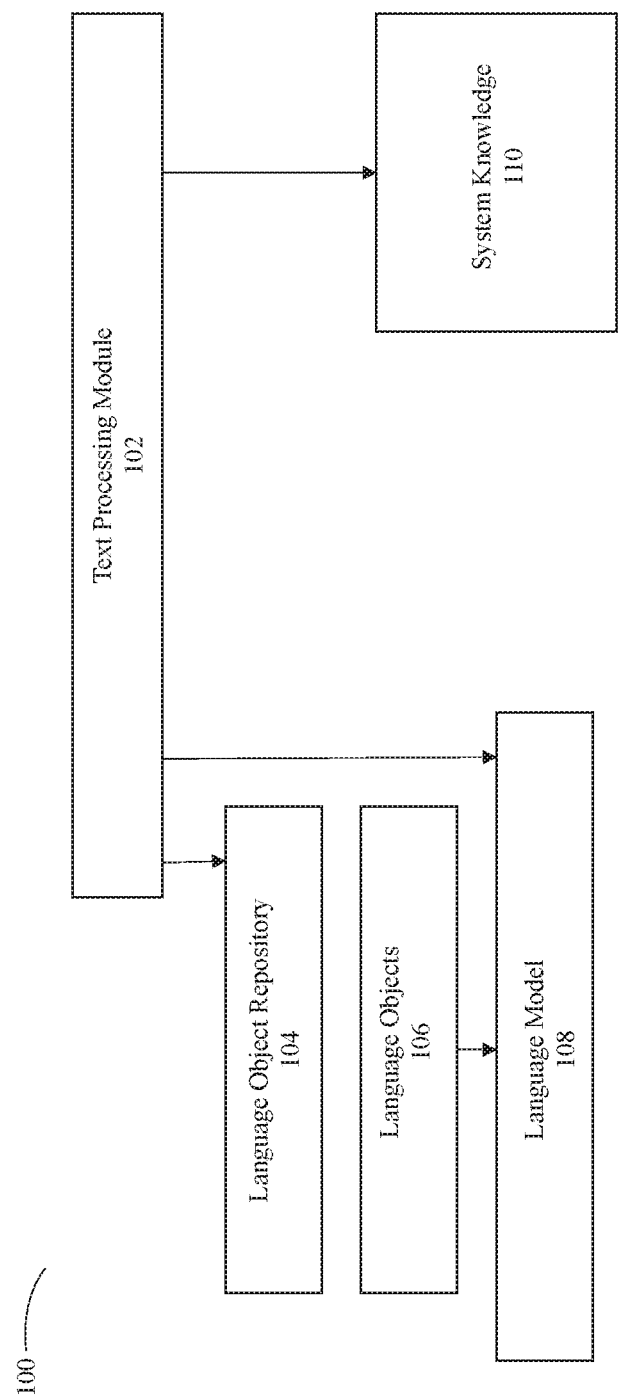
FIG. 1 illustrates an inventive system for text generation. This is a schematic representation of the high-level architecture of the system.

FIG. 1 illustrates a method for generating text. As used herein, "text" refers to text comprising one or more sentences in any one of multiple languages comprising, for example, natural languages, domain specific adaptations of natural languages, etc. As used herein, "natural language" refers to a language that human beings develop in an unpremeditated manner over a period of time. Natural languages comprise, for example, English, Indian languages such as Hindi, Kannada, Sanskrit, etc. The method disclosed herein is executed by a text generation system (TGS) comprising at least one processor configured to execute computer program instructions for generating text according to the disclosed method.

The system disclosed herein integrates a language model 108 to be used with the TGS for representing or describing the natural languages and processing algorithms that harness this language model 108 in generating text. The language model 108 recognizes that semantics precedes natural language communication. For example, every child builds a semantic model of the world around him/her even before he/she learns a single word of any language. The child first recognizes specific things, then specific actions of things, then specific properties of the specific things and actions, and ultimately, classifications of things and actions. Typically, a discourse in a natural language takes place to communicate semantics. The method disclosed herein uses a set of semantic items comprising things made available to the TGS. The semantic items made available to the TGS comprise, for example, conceptual or semantic representations of words and word phrases. The set of semantic items made available may be, and typically is, a selection from a larger repository of semantic items. Such a large repository is referred to as system knowledge 110 and the set of semantic items made available may be loosely described or referred to as a chunk of such system knowledge 110.

Figure 2:
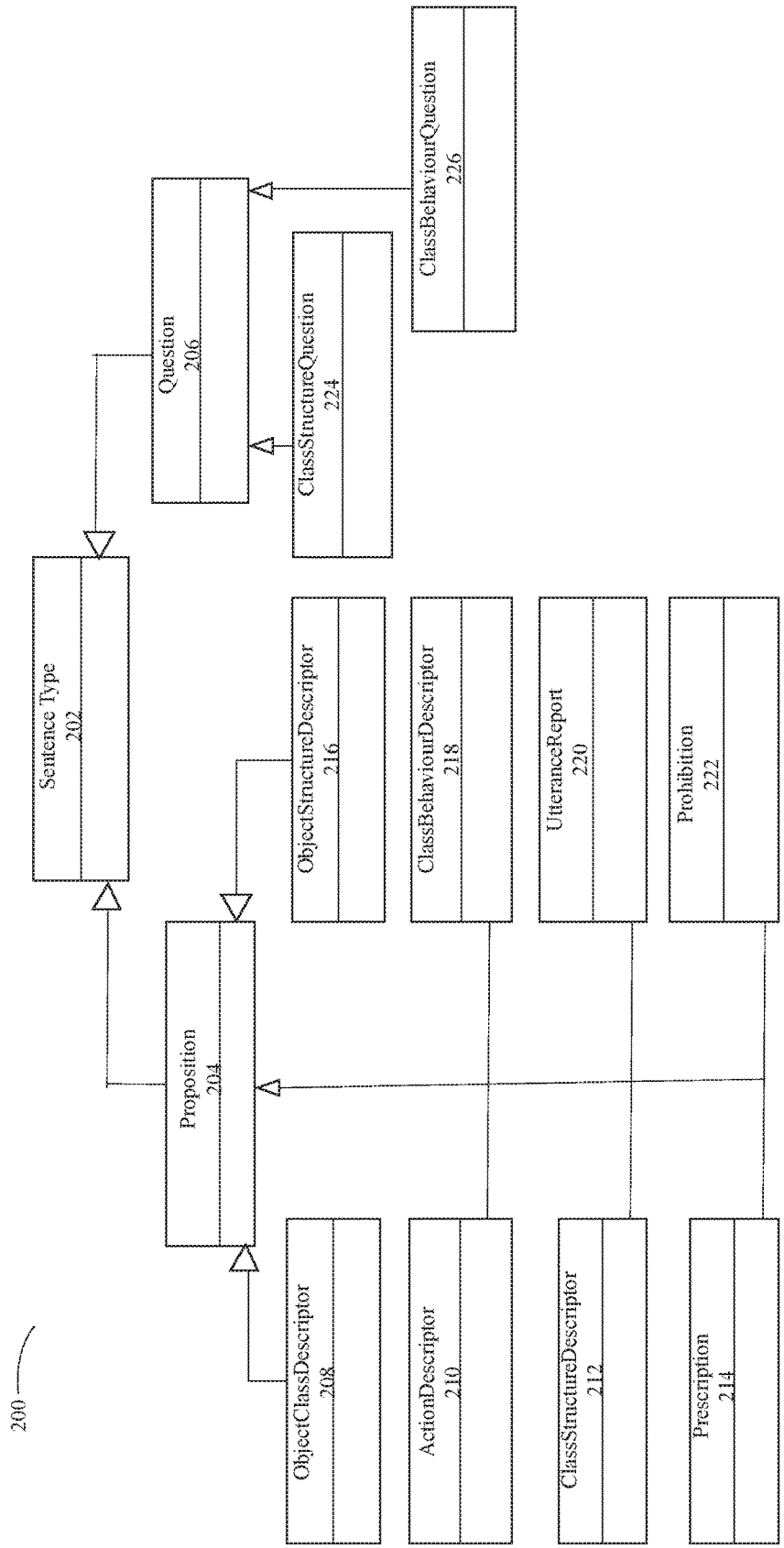
FIG. 2 illustrates a subset of a sentence type hierarchy employed by the text generation system for generating text.

FIG. 2 illustrates a subset of a sentence type hierarchy which is also a Class Diagram employing the Unified Modelling Language (UML) notation employed by the text generation system for generating text. Every sentence type has a unique semantic effect or semantic consequence and a sentence when parsed and understood, may update the system knowledge in accordance with such unique semantic effect. The set of sentence types may comprise, inter alia, sentence types that are commonly shared by all natural languages. For example, a sentence type named, "ObjectClassDescriptor" 208 that describes a class or a classification of an object. For example, a sentence "Amazon is a river" belongs to the sentence type "ObjectClassDescriptor 208.

A sentence type ActionDescriptor 210 may describe individual actions, that is, manifestations or instances of a behavioural pattern associated with a semantic classification of objects or an object class, sentence types that denote denial or negation, command, etc. For example, "The man walked ten miles." yields, on reading and analysis, an ActionDescriptor 210 utterance which yields on understanding, provided a preparatory knowledge base has been built, an update in the location of "The man" and the new location can, theoretically, be computed if the present location before starting to walk and the direction of walking are known from context and if space related core semantics are in place.

A sentence type ClassStructureDescriptor 212 describes a structural template of a classification of objects. For example, "Elephants have broad ears, long trunks and big stomachs." belongs to the sentence type ClassStructureDescriptor 212.

A sentence type ObjectStructureDescriptor 216 describes a structure of an individual object. For example, "Mary has a round face." belongs to the sentence type ObjectStructureDescriptor 216.

A sentence type ClassBehaviourDescriptor 218 whose specific semantic effect is to add to the list of behaviours of the object class. For example, "Elephants eat grass, plantains, sugarcane and rice".

Absence, in the system knowledge, of any information that is expected or eligible to be found in the context of a specific semantic item leads to the branch of the hierarchy headed by "Question" in the sentence type hierarchy. For example, in the context of a semantic item X that is an object having the reference value CLS_en_frock for its "objectClass" attribute, but not having a value for the attribute item ATR_en_colour and the ObjectClass instance CLS_en_frock is known to have an attribute ATR_en_colour, there is need for a question. Noting that the semantics related to space and time are fundamental, further that location in time and space are fundamental attributes of objects and actions. Absence of these information items in object and action semantic items may lead to LocationQuestion and ActionTimeQuestion. Absence of information about doer of an action item gives rise to an ActionDoerQuestion whereas absence of information about the target or object of an action can lead to an ActionTargetQuestion. When it is already known that an object class or an action class is associated with a certain attribute, if an object belonging to such object class or an action belonging to such action class has no value for the said attribute, then there is a case for an ObjectAttributeQuestion or an ActionAttributeQuestion. If we have an instance of an ObjectClassItem that does not contain a 'behaviour' element, or if the behaviour-element is incomplete (for example if the actionTarget item is absent within the 'behaviour' element, then there is a case for a ClassBehaviourQuestion (226). The data-structures, algorithm and method for generation of questions are broadly the same as for generating proposition utterances. The sentence part types for questions would be slightly different from the sentence part types for similar propositions. For example, we would have a sentence part type SPT_UNKNOWNDOER for an ActionDoerQuestion, instead of SPT_DOER needed for an ActionDescriptor proposition. We may have a sentence part type denoted by SPT_UNKNOWNLOCATION under a LocationQuestion and a sentence part type denoted by SPT_UNKNOWNTIME under an ActionTimeQuestion.

A sentence type ClassStructureQuery 224 represents a question about a structure shared by all objects belonging to a particular classification of objects. For example, an English question "Do tigers have tusks?" is a ClassStructureQuery 224.

A sentence type ClassBehaviourQuery 226 represents a question about a behavioural pattern shared by all objects belonging to a particular classification of objects. For example, an English question "Do frogs crawl?" is a ClassBehaviourQuery 226.

Figure 3:
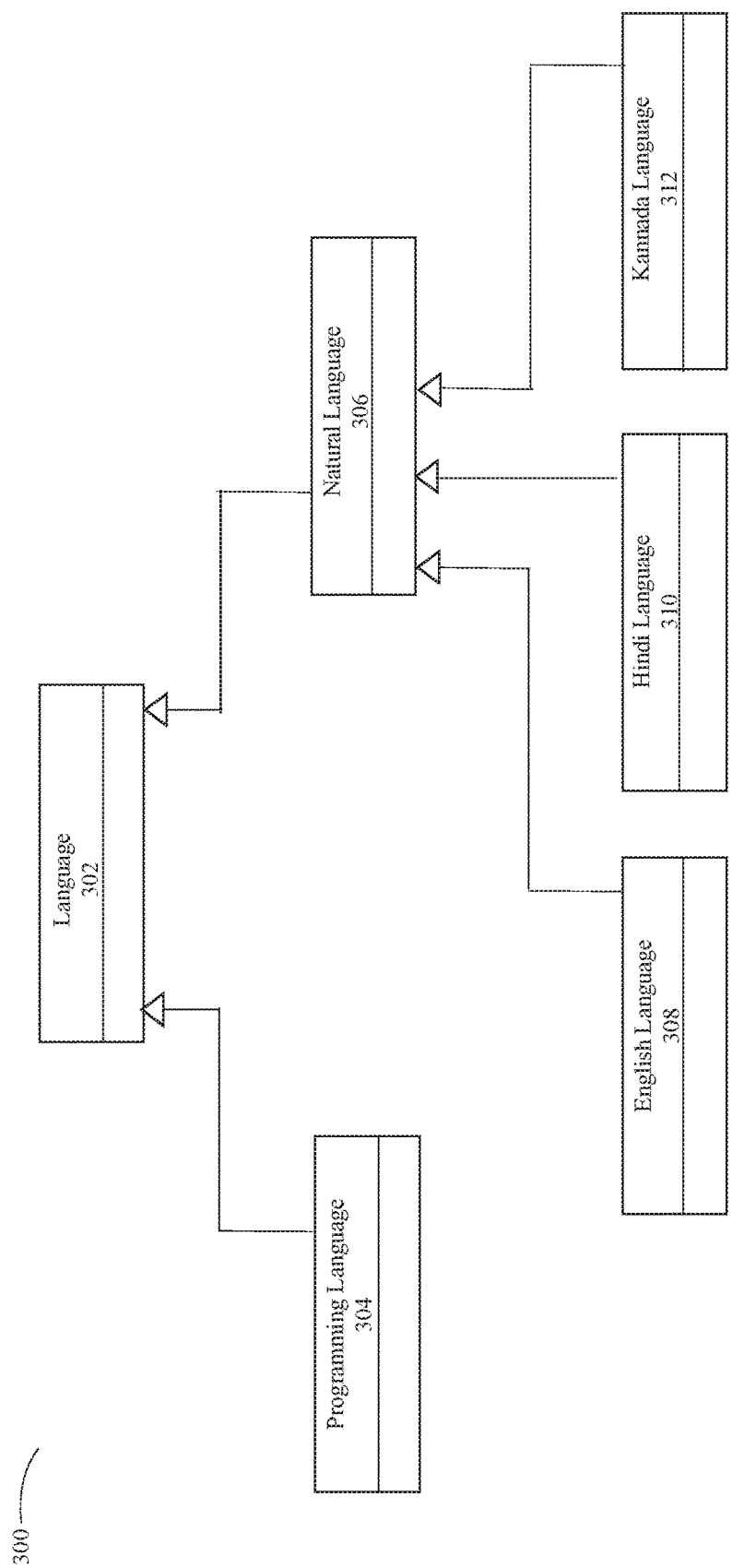
FIG. 3 illustrates a language hierarchy employed by the language processing and knowledge building system for processing textual data. This is also a Class Diagram employing the Unified Modelling Language (UML) notation.

FIG. 3 illustrates a language hierarchy employed by the text generation system. In an embodiment, an implementation of the text generation system (TGS) comprises text generation components based only on the generic language model, and to be practically demonstrable and useful, comprises one or more specific language objects for one of the natural languages to be supported. The language object components are constructed to conform to the language model disclosed above. The TGS is implemented, for example, in an object oriented programming language such as Java to have a class Language 302 as a base class which comprises various constituent members that may not be completely populated, and to have an initialization method (initialize( )) for which subclasses, for example, "NaturalLanguage" 306 and "ProgrammingLanguage" 304 may provide overriding implementations and/or supplemental implementations. Further, on initialization, various subclasses thereof, for example, "NaturalLanguage" 306 and "ProgrammingLanguage" 304 perform different functions, where members of the class "Language" 302 are created and/or completely populated. In the subclass "NaturalLanguage" 306, in an overriding implementation of the initialization method, the member for vocabulary classes is populated with objects representing the parts of speech shared by multiple natural languages. A vocabulary class features case, a gender, and a number may be created and added to the noun vocabulary class. A vocabulary class feature tense is created and added to the verb vocabulary class. The member for the sentence type set is populated with the sentence types "ClassStructureDescriptor", "ClassBehaviourDescriptor", "ActionDescriptor" or the like. The member for the sentence part type set is populated with sentence part types "ClassDenoter", "BehaviourDenoter", or the like. The word to sentence part type association rule set is partly populated to include rules that hold valid across all natural languages. For example, specifying that the sentence part type "ClassDenoter" is an unspecified plural noun represented as "UnspecifiedPluralNoun". The BehaviourDenoter is a present tense verb which may be represented as "PresentTenseVerb". An ObjectDenoter is a specified noun represented as "SpecifiedNoun". The ActionDenoter is a 'past tense' verb represented as "PastTenseVerb". "EnglishLanguage" 308, "HindiLanguage" 310, and "KannadaLanguage" 312 representing the natural languages English, Hindi, and Kannada respectively can be implemented as singleton subclasses of the class "NaturalLanguage" 306, with an overriding implementation of the initialization method that sets up the vocabulary or lexicon, populates the word to word association rules, and completes populating for word to sentence part type association rule sets. The TGS may communicate with the language object repository and facilitates construction of a specific language object for a specific language and storing of the constructed language object in the language object repository. Thus, the method disclosed herein provides a framework that works for multiple languages, abstracts out and incorporates the commonalities among multiple languages, provides a template for developing specific language components or objects, and facilitates development and plug in of such specific language components or objects in a way that is economical in terms of time, effort, and cost.

Figure 4A:
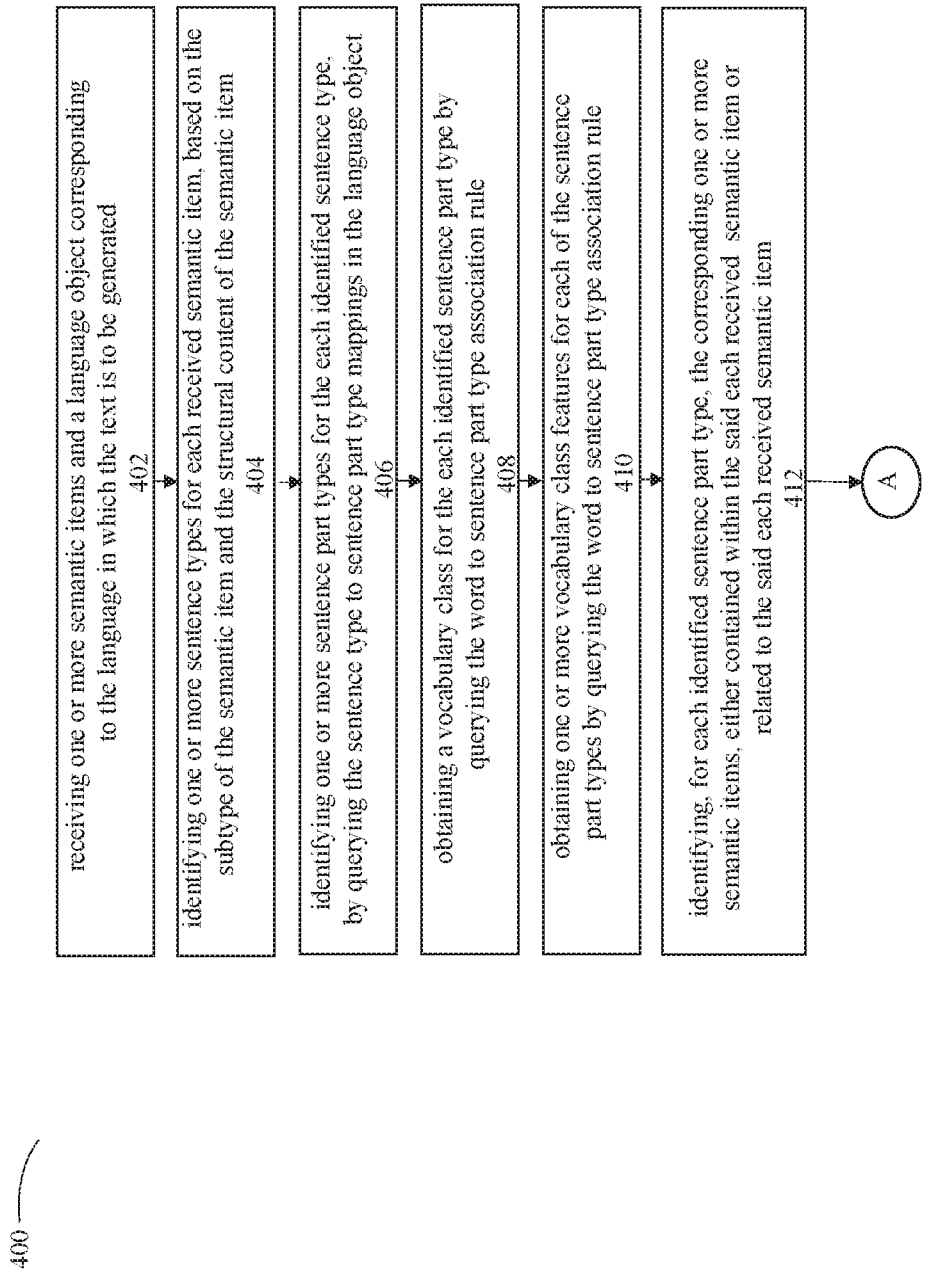
FIGS. 4a and 4b illustrates a flowchart comprising the steps performed by the text generation system generating text.
Figure 4B:
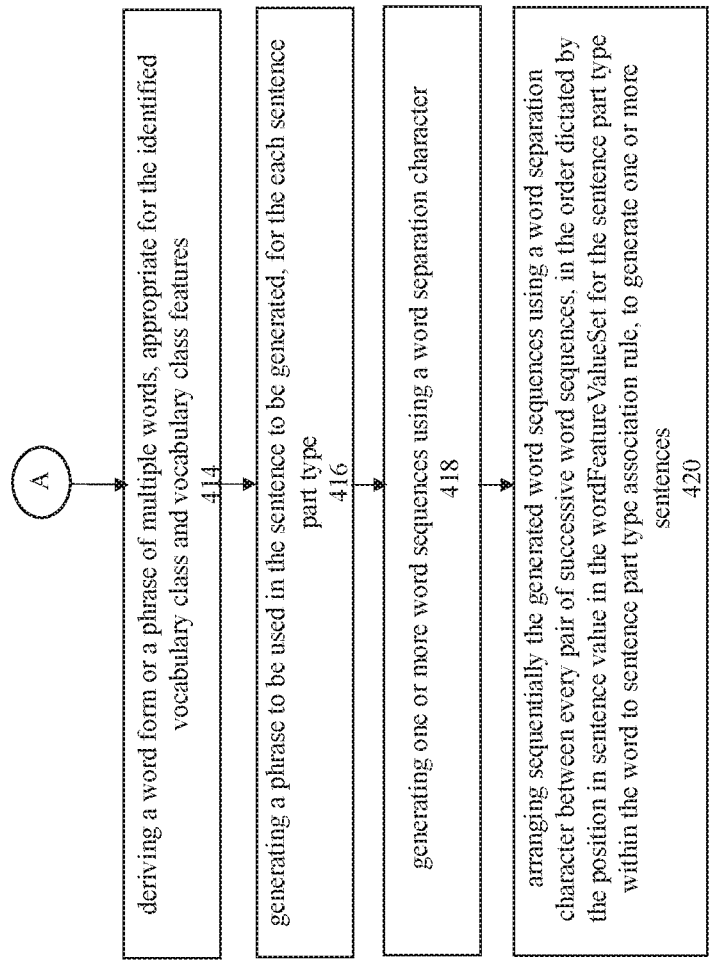

FIGS. 4a and 4b illustrates a process for generating text according to some embodiments. As shown at step 402, the process starts with receiving one or more semantic items and a language object corresponding to the language in which the text is to be generated. At step 404, one or more sentence types may be identified for each received semantic item, based on the subtype of the semantic item and the structural content of the semantic item. At step 406, one or more sentence part types may be identified for the each identified sentence type, by querying the sentence type to sentence part type mappings in the language object. At step 408, a vocabulary class may be identified for the each identified sentence part type by querying the word to sentence part type association rule. At step 410, one or more vocabulary class features may be obtained for each of the sentence part types by querying the word to sentence part type association rule. At step 412, for each identified sentence part type, identifying the corresponding one or more semantic items, either contained within the said each received semantic item or related to the said each received semantic item. At step 414, a word form or a phrase of multiple words may be derived, appropriate for the identified vocabulary class and vocabulary class features. At step 416, a phrase may be generated to be used in the sentence to be generated, for the each sentence part type. At step 418, one or more words may be generated using a word separation character. At step 420, the generated words may be arranged sequentially using at least one word separation character between every pair of successive words, in the order dictated by the position in sentence value in the WordFeatureValueSet for the sentence part type within the word to sentence part type association rule, to generate one or more sentences.

The steps in the construction of sentences are now illustrated with some actual examples. For this purpose inputs for sentence construction may be semantic items which are the objects in a computer's run-time memory. The implementation of the invention in the Java programming language may support a mechanism for representing such objects in memory in a text format using xml. So we use that representation for these actual examples. Such representations are helpful in also storing the chunk of knowledge in an xml file on the computer's disk-storage. Further, semantic items may be directly created in xml using the representation and then can be loaded as objects into the computer's run-time memory by parsing the xml. In such storage and loading, it is also feasible to use an implementation of a specification for binding xml to programming language objects, such as Castor Xml for Java-xml binding.

The language model further comprises a sentence type to sentence part type map. The sentence type to sentence part type map is a map of a sentence type to a set of sentence part types and map values comprise the sentence part types required in sentences of that sentence type. The language model further comprises an association rule set for the language. The association rule set comprises a set of association rules for the language. An association rule provides guidance about associating a word in a sentence with another word in the sentence or with a logical part of a sentence type. The association rule is either a word to word association rule, or a word to sentence part type association rule. The word to word association rules comprise rules for associating one word with another word based on a statically defined vocabulary class and vocabulary class features of the two words, and in an embodiment, on the dynamic feature of relative positions of the words. A word to word association rule is defined as a quartet {wordVC, targetVC, vcfSet, pisValuesRelation}, where "wordVC" is a vocabulary class of a word that can be or is to be associated. The vocabulary class of the word "targetVC" with which a word in a sentence with the vocabulary class equal to the first member "wordVC" of the quartet can be or is to be associated. The set of vocabulary class features "vcfSet" for which two words to be associated should have equal or matching or compatible values and "pisValuesRelation" represents a relation to be satisfied by the "relative position in sentence" values for the two words to be associated. In accordance with the word to word association rules, values are compulsory for "wordVC" and "targetVC" of the quartet and values are necessary for at least one of "vcfSet" and "pisValuesRelation" of the quartet.

The system and method for natural language generation disclosed above is described in detail below for illustrative and explanatory purposes for a person skilled in the art and is not meant to be limiting.

FIG. 4 exemplarily illustrates a method for generating text. As used herein, "text" refers to text comprising multiple sentences in any one of multiple languages comprising, for example, natural languages, domain specific adaptations of natural languages, etc. As used herein, "natural language" refers to a language that human beings develop in an unpremeditated manner over a period of time. Natural languages comprise, for example, English, Indian languages such as Hindi, Kannada, Sanskrit, etc. The method disclosed herein employs a text generation system (TGS) comprising at least one processor configured to execute computer program instructions for generating text. The method disclosed herein integrates a language model to be used with the TGS for representing or describing the natural languages and processing algorithms that harness this language model in generating text. The language model recognizes that semantics precedes natural language communication. For example, every child builds a semantic model of the world around him/her even before he/she learns a single word in any language. The child first recognizes specific things, then specific actions of things, then specific properties of the specific things and actions, and ultimately, classifications of things and actions. Typically, a discourse in a natural language takes place to communicate semantics. The method disclosed herein uses a set of semantic items comprising things made available to the TGS. The semantic items made available to the TGS comprise, for example, conceptual or semantic representations of words and word phrases. The set of semantic items made available may be, and typically is, a selection from a larger repository of semantic items. Such larger repository is referred to as system knowledge. And the set of semantic items made available may be loosely described or referred to as a chunk of such system knowledge.

Figure 5:
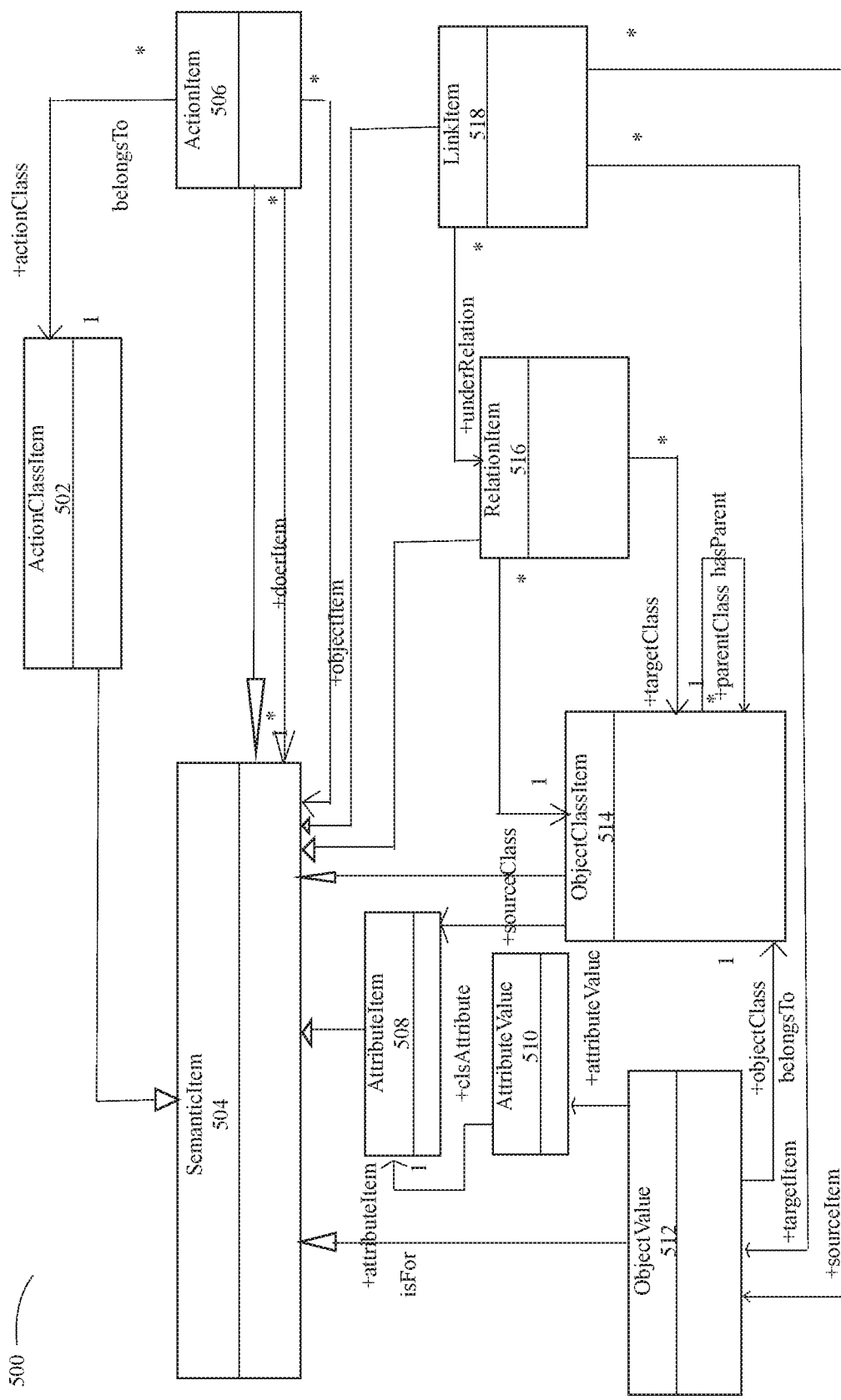
FIG. 5 describes the knowledge representation scheme.

The design structure of a subset of the system knowledge which is also a Class Diagram employing the Unified Modelling Language (UML) notation is exemplarily shown in FIG. 5. The system knowledge is a data structure configured to meet the requirements of natural languages, where the natural languages have no explicit barriers between the meta-levels and need to seamlessly keep moving between meta-levels. The design of the system knowledge recognizes the domain for natural language communication includes multiple meta-levels. The system knowledge comprises, for example, a first meta-level of objects, links between objects, and actions of objects, a second meta-level of object classes, action classes (also called and referred to as action categories), and associations between object classes, and a third meta-level of a meta-model for describing the object classes, associations, and action categories or action classes. In an embodiment, the system knowledge is configured based on the MetaObject Facility (MOF) standard which is published by Object Management Group (OMG). The system knowledge comprises a base SemanticItem that is a base class for every other class. The SemanticItem has a property called "expressions" which is a map, in which the keys are natural language International Organization for Standardization (ISO) codes and the values are lists of words or phrases denoting the item in those respective natural languages. The SemanticItem has another property called "semanticConnections" which is a list of semantic connections comprising connections of a particular semantic item with other semantic items in the system knowledge. The system knowledge further comprises a class of objects represented as "ObjectItem" (also called and referred to as "ClassOfObjects"), where every known object is an instance of this class of objects; a class of links represented as "LinkItem" (also called and referred to as "ClassOfLinks"), where every relation between two specific objects is an instance of this class of links; a class of actions represented as "ActionItem" 506 (also called and referred to as "ClassOfActions"), where every instance of this class is an action, with specific properties, performed by a specific object, where the specific properties comprise, for example, a location in space and time; a class of object-classes represented as "ObjectClassItem" 514 (also called and referred to as "ClassOfObjectClasses"), where every instance of this class represents an object class or a classification of objects and such an instance describes the properties and behaviour common to the objects belonging to the classification, where an object has a property called an "objectClass" for which the value is an instance of this class and where this class of object classes supports a sub classing mechanism. Under the sub classing mechanism, a semantic classification may be marked as a subtype of another higher level or a more inclusive semantic classification. Typically, object classes are represented by common nouns in root form. For example, for the word "horse" in English, the semantic classification CLS-en-horse is a subtype of the semantic classification CLS-en-animal, for the word "animal" in English, and for the value, CLS-en-animal is set for the attribute "parent Class" on CLS-en-horse. The sub-classing mechanism permits inferences about the structure and behaviour of a class. The subclass inherits structure and behaviour from a parent class. Similarly, all actions can be classified and we have a class called "ActionClassItem" 502 (also called and referred to as "ClassOfActionClasses")—where an instance of this class is an action class or classification of actions and describes the properties common to all actions that belong to this classification, where every action or instance of "ActionItem" 506 has a property called "aActionClass" for which the value is an instance of this class "ActionClassItem" 502 and where this class of action classes supports a sub classing mechanism. Typically, instances of "ActionClassItem" 502 are represented by verbs in root form. For instance, for the word "move" in English, we have an instance of "ActionClassItem" 502 represented by ACLS-en-move, and for the word "walk" in English, we have an instance of "ActionClassItem" 502 represented by ACLS-en-walk, which is a subtype of the semantic classification ACLS-en-move, and on ACLS-en-walk, the value for the attribute "parentClass" is set to ACLS-en-move. The attributes of ACLS-en-move, for example the attribute ATR-en-direction for the direction of movement represented by the word "direction" in English and the attribute ATR-en-distance for the distance moved represented by the word "distance" in English, are inherited by ACLS-en-walk. The effect(s) of an action can be and is described by action class to which the action belongs. The effect(s) may be on the doers of the action and/or on the objects of the action. For example, an action under ACLS-en-move results in a change in the value on the action doer for the attribute ATR-en-location (represented by the word "location" in English) and such change can be completely described in terms of the attributes ATR-en-direction and ATR-en-distance of ACLS-en-move. Further, behaviour of object classes can be and is described in terms of action classes. For example, "Elephants eat rice, plantains and sugarcane." The "AttributeItem" subtype of "SemanticItem" is an abstraction for or classification of the properties of objects. An object may be associated with zero or more "AttributeValue" instances where each "AttributeValue" instance is the value on one object for one "AttributeItem". The set of attributes for which an object may have value is determined by the object class to which the object belongs.

The system knowledge further comprises classification of actions represented as "ActionClassItem" 502 (also called and referred to as "ClassOfActionClasses"), where every instance of this class represents one classification of actions. This instance describes the properties common to actions belonging to the classification. The system knowledge further comprises a class of attributes represented as "AttributeItem" (also called and referred to as "ClassOfAttributes"), where every instance of this class represents an attribute that can be attached to a semantic classification, that is, an object class or an instance of a class of classes, or an action class, that is, an instance of a class of action classes. The system knowledge further comprises a class of relations represented as "RelationItem" (also called and referred to as "ClassOfRelations"), which abstracts the relations between things or objects to relations between object classes. The actions performed by an object fall under two groups, for example, behavioural actions and relation creating actions. The behavioural actions are actions performed by an object regularly and consistently, that are also performed by other objects belonging to the semantic classification to which the performing object belongs, that can be abstracted as a behaviour pattern to the level of the semantic classification to which the object may belong, and that may or may not involve another object, where the other object involved, if any, would not retain its existence and identity after the action is performed. The relation creating actions are actions that are not performed by the object regularly or consistently, that may not be also performed by other objects belonging to the semantic classification to which the performing object belongs, that cannot be abstracted as a behaviour pattern to the level of the semantic classification to which the object may belong, and that necessarily involves one or more other objects where such other one or more objects retain their existence and identity but with a change in state, after the action is performed, where in such created relations, each participating object is assigned a role.

The system knowledge further comprises a class of symbolic objects represented as "ClassOfSymbolicObjects", where a "SymbolicObject" represents a value or a range of values for an attribute and facilitates impressionistic and imprecise but meaningful communication about the object concerned. The system knowledge further comprises semantic connections represented as "SemanticConnections", that may be of different types. The "SemanticConnections" comprise, for example, (a) between two semantic classes "is ParentOf" and "is Child Of" to facilitate type hierarchies, from a parent to a child and from a child to a parent, where the two connections are reciprocal; (b) between a semantic class and an object, for example, "isTypeOf" from a semantic class to an object and "isInstanceOf" from an object to a semantic class, where the two connections are reciprocal; (c) between two semantic classes to facilitate a composition relation comprising "consistsOf" from a whole class or a composite class to a part class and "isPartOf" from a part class or a constituent class to a whole class, where the two connections are reciprocal; (d) between two objects comprising "contains" from a whole object or a composite object to a part or a constituent object and "isContainedIn" from a part or a constituent object to a whole or a composite object, where the two connections are reciprocal; (e) between a semantic class and an attribute, for example, "has Attribute" from a semantic class to an attribute and "isAttributeOf" from an attribute to a semantic class, where the two connections are reciprocal.

The system knowledge further comprises a set of rules to map the semantics of words. For example, every word that belongs to a vocabulary class represented by common nouns maps to an instance of the "ClassOfClasses", if the text that has been read supports the conclusion that such a semantic item has a structure and a behaviour, or maps to an instance of the "ClassOfAttributes", if the text that has been read supports the conclusion that such a semantic item does not have a structure and a behaviour, or maps to a symbolic object or to a role under a relation. Other rules to map the semantics of words comprise, for example, every verb root maps to an instance of the "ActionClassItem" (also called and referred to as "ClassOfActionClasses"); and every adjective and every adverb maps to a "SymbolicObject", that is, an object that encodes a probably imprecise and impressionistic value for an attribute that is understood adequately with respect to a population of objects in context.

The system knowledge further comprises a set of rules to derive the semantics of phrases comprising multiple words. For example, the collocation of nouns "cricket stadium" refers to a subclass of the class represented by "stadium"; "Lords Cricket Stadium" refers to a specific object whose object class is represented by "cricket stadium"; "Lords Cricket Stadium capacity" represents the seating capacity of Lords Cricket Stadium, that is, the value that the object Lords Cricket Stadium has for the attribute "capacity", because "capacity", inter alia, represents an attribute of the class represented by "stadium".

Figure 6:
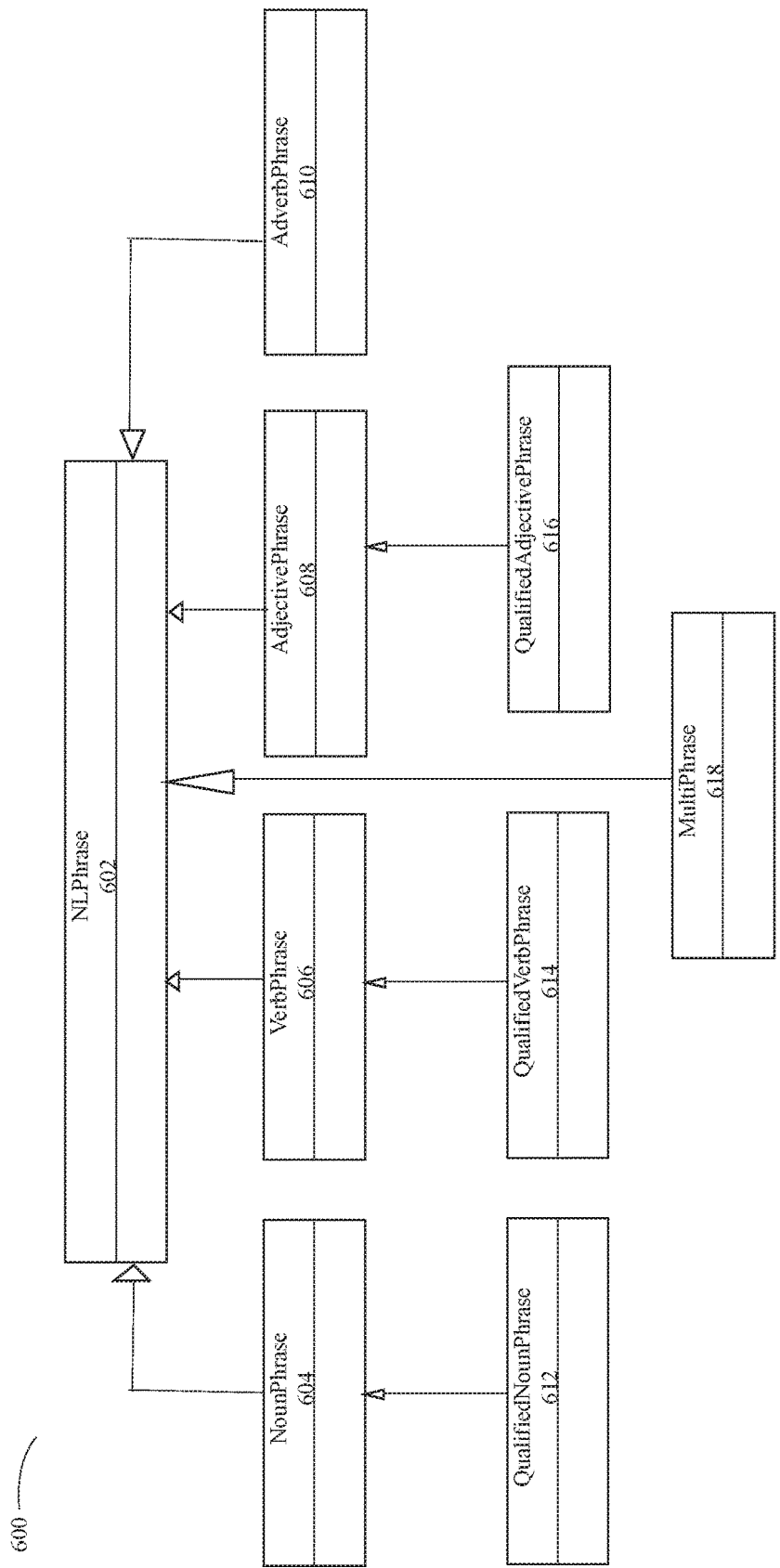
FIG. 6 illustrates a subset of the phrase-type hierarchy employed by the system.

A subset of the hierarchy of natural language phrase types 600 employed by the Text Generation System which is also a Class Diagram employing the Unified Modelling Language (UML) notation is presented in FIG. 6. The type 'NLPhrase' 602 is the base type for this hierarchy. At the next level we have the 'NounPhrase' 604, 'VerbPhrase' 606, 'AdjectivePhrase' 608 and 'AdverbPhrase' 610 to represent words in natural languages that are nouns, verbs, adjectives and adverbs, respectively. At the next level, 'QualifiedNounPhrase' 612 serves to represent natural language phrases in natural language that combine a noun and adjective, for example, English phrases such as "beautiful girl", "popular leader", "efficient manager", etc. A 'QualifiedNounPhrase' 612 object is built by composing a NounPhrase 604 object and an AdjectivePhrase 608 object. 'QualifiedVerbPhrase' 614 serves to represent phrases in natural language that combine a verb and an adverb, for example, English phrases such as "walked slowly", "read aloud", etc. A 'QualifiedVerbPhrase' 614 object is built by composing a VerbPhrase 606 object and an AdverbPhrase 610 object. Similarly, 'QualifiedAdjectivePhrase' 616 serves to represent phrases in natural languages that combine an adjective and an adverb, for example, English phrases such as "extremely popular", "really peculiar", etc. A "QualifiedAdjectivePhrase" 616 object is built by composing an AdjectivePhrase 608 object and an AdverbPhrase 610 object. 'MultiPhrase' 618 is useful for situations where, in natural language communication, multiple words of the same part of speech are used together to represent, for example a set or a team or a collection, etc. Examples of such phrases in English include "John and Mary", "cats and dogs", "jumped and grabbed", "old and young", "tigers, lions and leopards", "rapidly and irreversibly", etc. A 'MultiPhrase' 618 object is built by composing an array of NounPhrase objects or an array of VerbPhrase 606 objects or an array of AdjectivePhrase 608 objects or an array of AdverbPhrase 610 objects.

The Text Generation System (TGS) defines a set of rules to derive the semantics of natural language utterances. For example, an utterance or a sentence that yields, as parsing result, an action phrase represented as "ActionPhrase" that has a verb in the past tense and does not include negation, and a doer phrase represented as "DoerPhrase" that indicates one or more specific objects, is an "ActionDescriptor" whose semantic effect or semantic consequence is to produce a change in the state or states of the action doers represented by the "DoerPhrase" and, possibly, in the state or states of the action objects also referred to as action targets, and such effects may be indicated or specified in terms of the attributes of the "ActionPhrase". In another example, an utterance or a sentence which yields, as an analysis result, an "ActionPhrase" that has a verb in the present tense and does not include negation, and a "DoerPhrase" that indicates an unspecified large number of unspecified objects of a specific object type or a specific object class is a "ClassBehaviourDescriptor" whose specific semantic effect is to add to the list of behaviours of the object class.

A "DoerPhrase" with a proper noun or a common noun with an article indicates a specific object as a doer. A "DoerPhrase" with a noun in plural, without any article, indicates an object class. Such a sentence can also indicate a "ClassStructureDescriptor" if the verb involved is a member of the list returned by the language object for "verbsForComposition", and in this case, the objects for the verb denote the structural parts for the class denoted by the "DoerPhrase". For example, a sentence such as "Elephants eat grass and plantains" yields, on reading and analysis, a "ClassBehaviourDescriptor" utterance which yields, on understanding, a semantic class identified as CLS_en_GRASS with a meaning expression such as "a plant with long, narrow leaves and tubular stem" and a parent class identified as CLS_en_PLANT; a semantic class identified as CLS_en_PLANTAIN with a meaning expression such as "a coarse banana"; an action class named ACLS_en_EAT with a meaning expression such as "to take into the body by mouth as food"; another semantic class identified as CLS_en_ELEPHANT with a meaning expression such as "a large herbivorous mammal" and a parent class identified as en_MAMMAL with an entry in a classBehaviours map containing {ACLS_en_EAT, {CLS_en_GRASS, CLS_en_PLANTAIN}}. In another example, the sentence: "The man walked ten miles." yields, on reading and analysis, an ActionDescriptor utterance which yields on understanding, provided a preparatory knowledge base has been built, an update in the location of "The man" and the new location can, theoretically, be computed if the present location before starting to walk and the direction of walking are known from context and if space related core semantics are in place.

The Text Generation System (TGS) defines reciprocal rules to map semantics to natural language utterances. For example, an Actionitem is mapped to an ActionDescriptor that will have: 1. an ActionPhrase that has a verb in the past tense and does not include negation, 2. A DoerPhrase that represents the doerItem of the Actionitem. If the doerItem is an ObjectClassItem, the DoerPhrase will have a common noun in plural form; if the doerItem is an ObjectItem, the DoerPhrase will have a Proper Noun if the doerItem is a specific named object, the DoerPhrase will have a common noun with an article if the doerItem is an unnamed object. Similar rules are applied for each objectItem of the ActionItem.

In an embodiment, the set of semantic items may be made available as a string in an extensible markup language (XML). In another embodiment, the system knowledge may have been stored, for example, in an extensible markup language (XML) file on a local system. The XML representation/file have its own schema which is provided. The system knowledge so made available can be read and rendered as a rich runtime object, for example, in the Java programming language or the programming language used in the embodiment. A part of this system knowledge runtime object is made available and used in generating text.

In the method disclosed herein, the text generation system (TGS) receives the set of semantic items, for example, from a user device such as a personal computer, a laptop, a tablet computing device, a mobile phone, etc. A user may provide xml file path to the TGS, for example, using a command line interface. The command line interface is a user interface to an operating system of a user device or to an application in which the user responds to a visual prompt by typing in a command on a specified line, receives a response back from the operating system, and then enters another command. The user can invoke the TGS from the command line interface. In an embodiment, the TGS provides a graphical user interface (GUI), for example, an online web interface, a web based downloadable application interface, a mobile based downloadable application interface, etc., to allow a user to provide the set of semantic items. The core of the TGS processes the set of semantic items that is made available as a rich runtime object in the runtime memory. There are other components for various input channels such as a file on a local file system. Such components perform the processing needed for a specific input channel, and then invoke the TGS and pass the set of semantic items.

The text generation system (TGS) also receives a language object, for example, from a language object repository. As used herein, "language object" refers to an instance of the language model and is predefined for a natural language to be used in generating text. The language object is, for example, an English language object, a Sanskrit language object, or a Hindi language object, etc. An English language object comprises, for example, alphabets used in the English language such as A-Z, a vocabulary comprising, for example, a dictionary of words in English along with their meanings, punctuation marks such as a period, a comma, a colon, a semicolon, a question mark, etc., sentence types such as negation, sentence part types, word association rules used in the English language, etc. The language object repository is a map of International Organization for Standardization (ISO) codes of natural languages that the TGS supports for generating text, to relative language objects constructed and available in the TGS. In an example, if the target language for text generation is English, then the TGS receives a language object created for the English language from the language object repository. The TGS receives the set of semantic items and a character string representing the ISO code for the target natural language. The ISO code, for example, ISO 639 is a set of standards used to classify known languages. The TGS queries the language object repository using the input ISO code and obtains the language object represented, for example, as "textLanguageObject". If such a language object is not found or available, the TGS aborts or terminates the text generation session.

The language model comprises multiple alphabets, that is, a set of letters for a particular language in terms of visual and auditory representations, a vocabulary for the language comprising a list of words with a meaning, where each word is an ordered sequence of one or more letters in the language having visual and auditory representations depending on and derived from the visual and auditory representations of the constituent letters and can be mapped to one or more vocabulary classes. A vocabulary class is a multivalued mapping from the vocabulary to a vocabulary class set of the language model, is defined for each word in the vocabulary, and can be represented as VocabularyClassOf(vw) for a word "vw". Each vocabulary class "vc" has a name that is a member of the vocabulary and can be represented as nameOf(vc). The meaning of a word is a multivalued mapping from the vocabulary to the system knowledge. The meaning of a word is a subset of the system knowledge to which the word is mapped under a meaning map. The meaning of a word "vw" can be represented as MeaningOf (vw). The meaning for any word may be absent initially, but may be created and added.

The language model further comprises a set of punctuation marks or symbols comprising, for example, sentence terminators, list item separators, sentence clause separators, etc. For a language such as English, sentence terminators comprise, for example, full stops, exclamation marks, question marks, etc. For Indian languages such as Sanskrit and Hindi, a sentence terminator is, for example, "l". Further, for the English language, the list item separators comprise, for example, commas. The sentence clause separators for a language such as English comprise, for example, commas, inverted commas, semicolons, colons, etc. The language model further comprises a meta-word set comparable to a built-in vocabulary of programming languages. The meta-word set (MWS) comprises a set of words for a type (WT), a set of words for attribute (WA), a set of words for composition (WC), a set of words for existence (WE), etc. This last meta-word set, that is, the set of words for existence assists in recognizing utterances that often do not talk about a specific action but merely describe an existence of an object in a certain state, for example, "Rama was the prince of Ayodhya." or "John is jubilant."

The language model comprises the vocabulary class set for the language. The vocabulary class set is a set of vocabulary classes that achieves a classification of the words in the vocabulary, where each word in the vocabulary belongs to at least one vocabulary class. The vocabulary classes for natural languages comprise, for example, parts of speech comprising a noun, a pronoun, a verb, an adjective, an adverb, and other parts of speech. The vocabulary class for a programming language comprises, for example, "DataType" comprising integer, character, etc., an "AccessibilityIndicator" comprising, for example, private, protected, friend, public, etc. Each vocabulary class has a name which is a member of the vocabulary. A vocabulary class is associated with a set of vocabulary class features. The vocabulary class features comprise, for example, a case, a gender, a number, a tense, etc. A vocabulary class feature (vcf) is possibly multivalued and each vocabulary class feature has a name that is a member of the vocabulary and can be represented as "nameOf(vcf)". For a word "vw" in the vocabulary, if VocabularyClassOf(vw) is "vc" and if a vocabulary class feature "vcf" is defined for "vc", then the value of the vocabulary class feature "vcf" for the word "vw" is non-empty and may be represented as <<nameOf (vcf)>>Of(vw), where <<nameOf(vcf)>> is a place holder. If a "vcf" is not defined for VocabularyClassOf(vw), then "vcf" for "vw" is empty.

The language model further comprises a sentence type set comprising a set of sentence types or utterance types comprising, for example, denial or negation, command, prescription, prohibition, permission, capability, probability, etc. The sentence type set is a formalization of the speech acts concept. The speech acts concept represents communication semantics. A sentence type hierarchy provided in the Language Processing and Knowledge Building System (LP-KBS) is a formal, rigorous, comprehensive and computable refinement of the basic speech acts concept. The language model further comprises certain qualifications, for example, qualifications on sentence types and qualifications on the set of vocabulary classes to facilitate time and effort economies in the development of specific natural language objects and to facilitate handling of semantic integration for natural language communication. The sentence type set is a semantic classification of sentences or utterances. A sentence type of the sentence type set is not merely a syntax template but is associated with a set of sentence part types. The set of sentence types comprises, inter alia, sentence types that are commonly shared by all natural languages, for example, a sentence type named, for example, as a "ObjectClassDescriptor" that describes a class or a classification of an object, a sentence type named, for example, as a "ClassStructureDescriptor" that describes a structural template of a classification of objects, a sentence type named, for example, as a "ClassBehaviourDescriptor" that describes behavioural or action patterns of a classification of objects, a sentence type named, for example, as an "ObjectStructureDescriptor" that describes a structure of an individual object, a sentence type named, for example, as an "ActionDescriptor" that describes individual actions, that is, manifestations or instances of a behavioural pattern associated with a semantic classification of objects or an object class, sentence types that denote denial or negation, command, etc. For example, a sentence "Amazon is a river" belongs to the sentence type "ObjectClassDescriptor"; "Elephants have broad ears, long trunks and big stomachs." belongs to the sentence type "ClassStructureDescriptor"; "Elephants eat grass, plantains, sugarcane and rice." belongs to the sentence type "ClassBehaviourDescriptor"; "Mary has a round face." belongs to the sentence type "ObjectStructureDescriptor", and "John ran fast." belongs to the sentence type "ActionDescriptor". The sentence type qualification describing individual actions is subdivided into a variant sentence type that describes actions that affect another object and need, to be completely described, such another object to be explicitly specified or inferred from context, for example, the sentence "John ran fast", and a variant sentence type that describes actions that affect two other objects and need to be completely described for such other objects to be explicitly specified or inferred from context, for example, the sentence "Mary gave the book to Elizabeth."

The set of sentence types further comprises a class structure query represented as "ClassStructureQuery", a class behaviour query represented as "ClassBehaviourQuery", an action query represented as "ActionQuery", etc. The ClassStructureQuery represents a question about a structure shared by all objects belonging to a particular classification of objects. For example, an English question "Do tigers have tusks?" is a ClassStructureQuery. A ClassBehaviourQuery represents a question about a behavioural pattern shared by all objects belonging to a particular classification of objects. For example, an English question "Do frogs crawl?" is a ClassBehaviourQuery. In another example, an English question "Do snakes hop?" is also a ClassBehaviourQuery. The ActionQuery represents a question about what a specific object did. For example, an English question "What did you do this morning?" is an ActionQuery. The ActionQuery is positioned high in the sentence type hierarchy and has many subtypes, for example, an ActionDoerQuery such as an English question "Who wrote 'Comedy of Errors'?", where an action doer is an unknown; an ActionTargetQuery such as an English question "What did John eat?" where the target of the action is the unknown.

The language model further comprises a sentence part type set comprising sentence part types for a language. A sentence part type identifies a logical part of a sentence or an utterance. The sentence part type is, for example, a doer or an object target of an action captured in the sentence. The sentence part types comprise, for example, a class denoter represented as "ClassDenoter", a doer denoter represented as "DoerDenoter", an action denoter represented as "ActionDenoter", a composition denoter represented as "CompositionDenoter", an action attribute denoter represented as "ActionAttributeDenoter", a behaviour denoter represented as "BehaviourDenoter", a part denoter represented as "PartDenoter", a negation denoter represented as "NegationDenoter", a whole denoter represented as "WholeDenoter", an "ActionTarget", etc. ClassDenoter is a name provided to a logical part representing a classification of objects and appears in sentence types such as "ClassStructureDescriptor", "ClassBehaviourDescriptor", "Class StructureQuery", "ClassBehaviourQuery", etc. ClassDenoter helps communicate information related to which particular object classification has the structure or the behaviour that is being described. For example, in an English sentence "Cars have an engine, a transmission and a brake." the word "Cars" maps to the sentence part type ClassDenoter. DoerDenoter is a name provided to a logical part representing a doer of an action, that is, who did whatever was done, and appears in sentence types such as "ActionDescriptor", "ActionTargetQuery", etc. In the aforementioned example, "What did John eat?", the word "John" maps to the sentence part type DoerDenoter. ActionDenoter is the name provided to a logical part representing an action or what was done in sentence types such as "ActionDescriptor", "ActionTargetQuery", etc. CompositionDenoter is a name provided to a logical part representing a special type of action that is contained or included in sentence types such as "ClassStructureDescriptor", "ObjectStructureDescriptor", etc. For example, in the sentence "Cars have an engine, a transmission and a brake.", the word "have" is the CompositionDenoter. ActionAttributeDenoter is a logical part in sentence types such as "ActionDescriptor" and "ActionAttributeQuery" that helps convey information about other attributes of an action over and above the objects directly involved in the action. For example, in the sentence "Mary bought an old copy of 'War and Peace' from a pavement book vendor for just one dollar!", the phrase "just one dollar" communicates the price paid which is an attribute of "buy" actions. BehaviourDenoter is a name provided to a logical part representing behaviour of objects.

A sentence belongs to a particular sentence type if the sentence has parts, that is, phrases, corresponding to or mappable to members of the set of sentence part types associated with the sentence type. Each sentence type has a specific type of a semantic consequence on the underlying knowledge for the discourse. Such a semantic consequence can be described in terms of the associated sentence part types. Values for the attributes of the objects involved in an action may be impacted by the values for action attributes. For example, when "Mary bought an old copy of 'War and Peace' from a pavement book vendor for just one dollar!" her "cash in hand" was reduced by "one dollar". In terms of the language model, a sentence or an utterance is a set, not necessarily ordered, of sentence words where a sentence word is a member of the vocabulary or named things and is combined, for example, suffixed with a punctuation mark. Each word "vw" in the vocabulary has an associated feature value set "fvs" that can be represented, for example, as fvsOf(vw). The feature value set is a set of ordered pairs that can be represented as fvsOf(vw)=(ftr, ftrvalue), where "ftr" is a vocabulary class feature defined for VocabularyClassOf (vw) and "ftrvalue" is the value for the vocabulary class feature, for example, male for a gender vocabulary class feature. Typically, a word occurring in a sentence or an utterance has an additional feature that is relative position in the sentence represented as "position in sentence". The language model supports this position in the sentence. The position in the sentence feature is a contextual feature or a dynamic feature and is distinct from intrinsic or static features defined for a word based on a vocabulary class of the word. The value of this position in the sentence feature for any word "vw" in a sentence is represented, for example, as posOf(vw, inSentence) and is represented either as ATSTART or as a relative value in relation to the value of the same feature for another word in the sentence, where ATSTART is a special symbol meaning the position is at the very start of the sentence. A complete feature value set or an extended feature value set of a word occurring in a sentence is a set union of a set represented, for example, by fvsOf(vw) and a set comprising a single pair (position in sentence, posOf(vw, inSentence)). For example, in the sentence "The prince fell in love with the beautiful princess.", for the word "The", the position in the sentence has an absolute value ATSTART and a relative value represented by a symbol BEFORE_NOUN, and for the word "the", the position in the sentence has a relative value represented by a symbol BEFORE_QUALIFIED_NOUN. Similarly, for the word "beautiful", the position in the sentence has the relative value BEFORE_NOUN. In view of the combinatorial explosion typically encountered in natural language utterances, grammar rules are optimally specified in terms of relative values for the position in the sentence.

The language model further comprises a sentence type to sentence part type map. The sentence type to sentence part type map is a map of a sentence type to a set of sentence part types and map values comprise the sentence part types required in sentences of that sentence type. The language model further comprises an association rule set for the language. The association rule set comprises a set of association rules for the language. An association rule provides guidance about associating a word in a sentence with another word in the sentence or with a logical part of a sentence type. An association rule is either a word to word association rule or a word to sentence part type association rule. The word to word association rules comprise rules for associating one word with another word based on a statically defined vocabulary class and vocabulary class features of the two words, and in an embodiment, on the dynamic feature of relative positions of the words. A word to word association rule is defined as a quartet {wordVC, targetVC, vcfSet, pisValuesRelation}, where "wordVC" is a vocabulary class of a word that can be or is to be associated, "targetVC" is a vocabulary class of the word with which a word in a sentence with the vocabulary class equal to the first member "wordVC" of the quartet can be or is to be associated, "vcfSet" is a set of vocabulary class features for which two words to be associated should have equal or matching or compatible values, and "pisValuesRelation" represents a relation to be satisfied by the "position in sentence" values for the two words to be associated. In accordance with the word to word association rules, values are compulsory for "wordVC" and "targetVC" of the quartet and values are necessary for at least one of "vcfSet" and "pisValuesRelation" of the quartet.

A word to sentence part type association rule is defined as a triplet {spt, wordVC, wordFeatureValueSet}, where "spt" represents a sentence part type for a sentence type, "wordVC" represents a vocabulary class of a word that is to be or can be associated or mapped to the sentence part type represented by the first member "spt" of the triplet, and "wordFeatureValueSet" is a set of ordered pairs represented as wordFeatureValueSet=(wordFeature, featureValue), where "wordFeature" is a feature of a word and is either a vocabulary class feature or positionInSenetnce (a key of member of the complete feature value set) and "featureValue" is a valid value permissible for that feature. For example, in a natural language that enforces distinct forms for nominative and objective cases, for a sentence type "Class StructureDescriptor" with associated sentence part types "WholeDenoter", "CompositionDenoter", and "PartDenoter", a word to sentence part type association rule is specified without using the position in the sentence as: {WholeDenoter, Noun, {Case, NOMINATIVE}}, {CompositionDenoter, Verb, {Tense, PRESENT}}, and {PartDenoter, Noun, {Case, OBJECTIVE}}. In another example, in a language such as English that does not have distinct forms for nominative and objective cases, for the same sentence type "ClassStructureDescriptor" with associated sentence part types "WholeDenoter", "CompositionDenoter", and "PartDenoter", a word to sentence part type association rule is specified using the position in the sentence as: {WholeDenoter, Noun, {position in sentence, ATSTART}}, {CompositionDenoter, Verb,{{Tense, PRESENT}, {position in sentence, AFTER_WHOLEDENOTER}}}, and {PartDenoter, Noun, {position in sentence, AFTER_COMPOSITIONDENOTER}}.

Although a language object that is an instance of the language model comprises specific values for each of the alphabets, vocabulary, vocabulary classes, punctuation marks, etc., parts of the above association rules may be common across all natural languages. For example, for the sentence type "ClassBehaviourDescriptor" comprising sentence part types "ClassDenoter" and "BehaviourDenoter", a common rule is that a word or a phrase of a noun vocabulary class, plural in number, subjective in case, without an article mark-up can be mapped to the sentence part type "ClassDenoter" and a word or a phrase of a verb vocabulary class with a value "present" for a vocabulary class feature "tense" can be mapped to the sentence part type "BehaviourDenoter". Other parts of the rules may be different for different languages. For example, in English, for the sentence type "ClassBehaviourDescriptor" comprising sentence part types "ClassDenoter" and "BehaviourDenoter", the mapping rule states that the sentence part type "ClassDenoter" should be first in the sentence and the sentence part type "Behaviour-Denoter" should be the immediate next. In another example, in Sanskrit, the mapping rule states that the phrases for these should have same values for number and gender. The language model further comprises a semantic compounding mechanism for a language in the form of a map of a semantic compounding type to mechanism. Thus, the language object is a specific instance of the language model.

The language model is generic enough to fit multiple natural languages and support new languages or domain specific languages as subsets of natural languages. For example, a domain specific language for describing a structure of complex hierarchical composite types can omit past tense and adverbs.

The set of vocabulary classes for which the language model comprises qualifications, comprises, inter alia, vocabulary classes that are commonly shared by all natural languages, for example, a noun vocabulary class with vocabulary class features "case", "gender", and "number", that represents classifications of all objects experienced and thought of by humans, for example, experiential objects such as space, time, and tangible physical objects; a verb vocabulary class that represents behaviour or action patterns of classifications of objects and has a vocabulary class feature, for example, "tense" to accommodate a description of actions at various points in time, that is, the past, the present, and the future; an adjective vocabulary class that represents, in an imprecise or impressionistic manner and with economy of expression, values that individual objects have for properties applicable to their classification; an adverb vocabulary class that represents, in an imprecise or impressionistic manner and with economy of expression, values that individual actions have for properties applicable to their classification; and a pronoun vocabulary class that represents references to named or unnamed entities earlier encountered in the discourse to facilitate economy of expression. Furthermore, word to word association rules commonly shared across multiple natural languages comprise, for example, a word denoting an object can be associated with a word imprecisely or impressionistically describing a value the object has, for a property applicable to the object's classification, that is, nouns can be associated with adjectives, and a word denoting an action can be associated with a word imprecisely or impressionistically describing the value the action has, for a property applicable to the action's classification, that is, verbs can be associated with adverbs.

In an embodiment, an implementation of the text generation system (TGS) comprises text generation components based only on the generic language model, and to be practically demonstrable and useful, comprises one or more specific language objects for other natural languages that can be supported. The language object components are constructed to conform to the language model disclosed above. The TGS is implemented, for example, in an object oriented programming language such as Java to have a class "Language" as a base class which comprises various constituent members that may not be completely populated, and to have an initialization method (initialize( )) for which subclasses, for example, "NaturalLanguage" and "ProgrammingLanguage" can provide overriding implementations and/or supplemental implementations. On initialization, various subclasses thereof, for example, "NaturalLanguage" and "ProgrammingLanguage" perform different functions, where members of the class "Language" are created and/or completely populated. In the subclass "NaturalLanguage", in an overriding implementation of the initialization method, the member for vocabulary classes is populated with objects representing the parts of speech shared by multiple natural languages; a vocabulary class features case, a gender, and a number are created and added to the noun vocabulary class; a vocabulary class feature tense is created and added to the verb vocabulary class; the member for the sentence type set is populated with the sentence types "ClassStructureDescriptor", "ClassBehaviourDescriptor", "ActionDescriptor", etc.; and the member for the sentence part type set is populated with sentence part types "ClassDenoter", "BehaviourDenoter", etc.; and the word to sentence part type association rule set is partly populated to include rules that hold valid across all natural languages, for example, specifying that the sentence part type "ClassDenoter" is an unspecified plural noun represented as "UnspecifiedPluralNoun", the BehaviourDenoter is a present tense verb represented as "PresentTenseVerb", the ObjectDenoter is a specified noun represented as "SpecifiedNoun", the ActionDenoter is a past tense verb represented as "PastTenseVerb", etc. "EnglishLanguage", "HindiLanguage", and "KannadaLanguage" representing the natural languages English, Hindi, and Kannada respectively can be implemented as singleton subclasses of the class "NaturalLanguage", with an overriding implementation of the initialization method that sets up the vocabulary or lexicon, populates the word to word association rules, and completes populating for word to sentence part type association rule sets. The TGS communicates with the language object repository and facilitates construction of a specific language object for a specific language and storing of the constructed language object in the language object repository. Thus, the method disclosed herein provides a framework that works for multiple languages, abstracts out and incorporates the commonalities among multiple languages, provides a template for developing specific language components or objects, and facilitates development and plug in of such specific language components or objects in a way that is economical in terms of time, effort, and cost.

In the method disclosed herein, after receiving the set of semantic items and the language object, the text generation system (TGS) processes each semantic item in the set one after another and generates the natural language text for describing that semantic item. For each semantic item, the TGS first identifies the subtype—that is, whether the item is a ObjectClassItem or an ObjectItem or a RelationItem or a LinkItem or an ActionItem. The TGS then does processing based on the identified type and the description of the processing follows.

1) Identify the Sentence Type(s) for the input semantic item. For an ObjectClassItem, ClassStructureDescriptor is needed, if the ObjectClassItem has elements describing the structure of objects or instances of the Class and ClassBehaviourDescriptor sentence type is needed if the ObjectClassItem has elements describing the behaviour of objects or instances of the Class. For an ObjectItem, similarly, just an ObjectExistanceDescriptor sentence type is needed if the ObjectItem has value only for the objectClass attribute, but an ObjectStructureDescriptor sentence type is needed if the ObjectItem contains elements for the attribute-values and components of the object and ObjectBehaviourDescriptor sentence type is needed if the object has elements describing the behaviour of the object. For an Actionitem, an ActionDescriptor sentence type is needed. For an Actionitem with a single object, TargetedActionDescriptor sentence type is needed. For an Actionitem with two objects, such as an action representing a girl giving a book to a friend (we will refer to the first object as 'CONVEYED' and the second as 'TARGET'), a ConveyedActionDescriptor sentence type is needed.

2) For each identified SentenceType, identify the Sentence Part Types needed, by querying the sentence type to sentence part type map in the language model and language object. For example, for the ClassBehaviourDescriptor sentence type, the needed Sentence Part Types are SPT_DOER, SPT_TGTD_ACTION and SPT_ACTIONTARGET; and for the ObjectExistanceDescriptor, the needed Sentence Part Types are SPT_DOER, SPT_EXIST_ACTION and SPT_DOERTYPEORVALUE. For a ConveyedActionDescriptor, the needed Sentence Part Types are SPT_DOER, SPT_CONVEYED_ACTION, SPT_CONVEYANCETARGET and SPT_ACTIONCONVEYED.

3) For each of the identified Sentence Part Types, identify the semantic items—within the input semantic item—that are to be used. For example, an action or instance of ActionItem will have references to action class item, doer-item(s) and object-item(s) (which may also be called or referred to as action-target-item(s)), the TargetedActionDescriptor sentence type will have sentence part types designated as SPT_DOER, SPT_TGTD_ACTION and SPT_ACTIONTARGET, so the referred action class item is mapped to SPT_ACTION, the referred doer-item is mapped to SPT_DOER and the referred object-item is mapped to the SPT_ACTIONTARGET.

4) For each of the identified Sentence Part Types, identify the vocabulary class and the vocabulary class features needed or prescribed, by querying the word to sentence part type association rules in the language model and target-language. For example, for SPT_DOER, the vocabulary class is NOUN, with NOMINATIVECASE as the value for the case vocabulary class feature. Similarly, for SPT_CONVEYED_ACTION, the vocabulary class is VERB with PASTTENSE as the value for the tense vocabulary class feature, for SPT_ACTIONCONVEYED, the vocabulary class is NOUN, with OBJECTIVECASE as the value for the case vocabulary class feature, while for SPT_CONVEYANCETARGET, the vocabulary class is NOUN, with DATIVECASE as the value for the case vocabulary class feature.

5) For each of the identified Sentence Part Types, create an appropriate natural language phrase object, using a small set of rules: for SPT_DOER, SPT_ACTIONTARGET, SPT_CONVEYANCETARGET and SPT_ACTIONCONVEYED, NounPhrase objects would be created; however, if the mapped semantic item had a SymbolicObject instance(s) as value(s) set for one (or more) attribute(s), a QualifiedNounPhrae object would be created; for SPT_ACTION, SPT_TARGETED_ACTION and SPT_CONVEYEDACTION, a VerbPhrase object would be created; however, if the ActionItem instance had values set for one or more action attributes, a QualifiedVerbPhrase object would be created.

6) Further, for each sentence part type, fully build the created phrase object, using the mapped semantic items. For this purpose, first the word-root in the target-language is read from the value for the "expressions" property on the mapped semantic item. Then, to construct the word form or expression for the identified vocabulary class features, by querying the target-language, a decision is made whether to use connectors or morphed-forms to achieve or realize the word form with the required vocabulary class features. If connectors are to be used, the target-language is again queried to obtain the connector-words and the relative location of the connector-words to the word root. If morphed forms are to be used, the target-language is queried to obtain the morphing rules; then the morphing rules are applied on the word-root to obtain the word form appropriate for the applicable vocabulary class features. For example, English language prescribes pre-connectors for case forms of nouns: "by" for the INSTRUMENTALCASE, "to" for the DATIVECASE, "of" for POSSESSIVECASE and "in" for LOCATIVECASE, but none at all for NOMINATIVECASE and OBJECTIVECASE; while the Kannada language prescribes morphing rules for case variants, typically by adding suffixes, the rules being dependent on the end-vowel of the noun-word—for example, for NOMINATVECASE, if the noun-word ends in the vowel "●", the suffix is "□□" or "□□" depending on the value for the vocabulary class feature gender, if the noun-word ends in the vowel "●", the suffix is "□□" and if the noun-word ends in the vowel "□", the suffix is "□□"; for OBJECTIVE CASE, if the noun-word ends in the vowel "●", the suffix is "□□□□", if the noun-word ends in the vowel "●", the suffix is "□□□□" and if the noun-word ends in the vowel "●", the suffix is "□□□□".

7) Construct the sequence of phrases using the Sentence-Part Association Rules, using the position-feature if the language so demands. For example, English language prescribes the word-order SPT_DOER, SPT_TGTD_ACTION and SPT_ACTIONTARGET for the Sentence Type TargetedActionDescriptor, so the sequence of phrases would be {<DOER-PHRASE>, <TGTD-ACTION-PHRASE>, <ACTIONTARGET-PHRASE>}; Kannada language prescribes the word order SPT_DOER, SPT_ACTIONTARGET and SPT_TGTD_ACTION for the same Sentence Type TargetedActionDescriptor, so the sequence of phrases would be {<DOER-PHRASE>, <ACTIONTARGET-PHRASE>, <TGTD-ACTION-PHRASE>}; Sanskrit language does not prescribe any word order at all, so any sequence is fine.

8) Query the language object for the word-separators.

9) The word sequence for each built natural language phrase object is then built by applying the word association rules obtained from the language object and using the word-separator. For example, for QualifiedNounPhrase object, English stipulates the adjective-part to come first and the noun-part next: so, the word sequence would be: word for the constituent-adjective-phrase, word separator and then word for the constituent-noun-phrase. Similarly, for a QualifiedVerbPhrase object, Kannada stipulates the adverb-part to come first and the verb-part next: so the word-sequence would be: word for the constituent-adverb-phrase, word separator and then word for the constituent-verb-phrase.

10) Query the language object for the sentence-terminators. Construct the sentence-text using built word sequences, the word-separators and sentence-terminators: Start with the first phrase in the sequence of phrases; while there is next phrase in the sequence of phrases, append a word-separator and the next phrase; append a sentence-terminator. For example, English Hindi, Sanskrit and Kannada languages use a space character as word-separator; English and Kannada use the period ('.') as a sentence-terminator while Hindi and Sanskrit use the character '|' as a sentence-terminator. If the sentence type is a query or question (instead of a proposition), the sentence-terminator, in most languages, is typically '?'.

The steps in the construction of sentences are now illustrated with some actual examples. For this purpose, we have to first note that the inputs for sentence construction—the semantic items—are objects in the computer's run-time memory, just as objects and images within the human mind drive construction of utterances by humans. However, the implementation of the invention in the Java programming language supports a mechanism for representing such objects in memory in a text-format using XML (extensible markup language). So we use that representation for these actual examples. Such representations are helpful in also storing the chunk of knowledge in an xml file on the computer's disk-storage. Further, semantic items can be directly created in xml using the representation and then can be loaded as objects into the computer's run-time memory. In such storage and loading, in an embodiment, an XML-schema has been created, to match the knowledge representation format, and an XML-utility called Castor XML has been used. We have the following xml representation for a chunk of knowledge:

```xml
<knowledgeNet>
<anAttribute itemname="ATR_en_name" xsi:type="AttributeItem">
<nlRepresentation                xmlns:          java=http://java.sun.com
xsi:type="java:org.exolab.castor.mapping.MapItem">
<key xsi:type="java:java.lang.String">en</key>
<value xsi:type="NatLangRepresentation">
<theRepresentation>name<theRepresentation>
</value>
</nlRepresentation>
</anAttribute>
<anActionClass itemName="ACLS_en_eat" xsi:type="ActionClassItem">
<          nlRepresentation          xmlns:java=http://java.sun.com
xsi:type="java:org.exolab.castor.mapping.MapItem">
<key xsi:type="java:java.lang.String">en</key>
<value xsi:type="NatLangRepresentation">
<theRepresentation>eat<theRepresentation>
</value>
</nlRepresentation>
<nlRepresentation          xmlns:java=http://java.sun.com
xsi:type="java:org.exolab.castor.mapping.MapItem">
<key xsi:type="java:java.lang.String">hi</key>
<value xsi:type="kns:NatLangRepresentation">
<theRepresentation> □□ </theRepresentation>
</value>
</nlRepresentation>
</anActionClass>
<anActionClass itemName="ACLS_en_marry" xsi:type="ActionClassItem">
<          nlRepresentation          xmlns:java=http://java.sun.com
xsi:type="java:org.exolab.castor.mapping.MapItem">
<key xsi:type="java:java.lang.String">en</key>
<value xsi:type="NatLangRepresentation">
<theRepresentation>marry<theRepresentation>
</value>
</nlRepresentation>
</anActionClass>
<anActionClass itemName="ACLS_en_give" xsi:type="ActionClassItem">
<          nlRepresentation          xmlns:java=http://java.sun.com
xsi:type="java:org.exolab.castor.mapping.MapItem">
<key xsi:type="java:java.lang.String">en</key>
<value xsi:type="NatLangRepresentation">
<theRepresentation>give<theRepresentation>
</value>
</nlRepresentation>
</anActionClass>
<anObjectClass itemName="CLS_en_plantain" xsi:type="ObjectClassItem">
<          nlRepresentation          xmlns:java=http://java.sun.com
xsi:type="java:org.exolab.castor.mapping.MapItem">
<key xsi:type="java:java.lang.String">en</key>
<value xsi:type="NatLangRepresentation">
<theRepresentation>plantain</theRepresentation>
</value>
</nlRepresentation>
<nlRepresentation          xmlns:java=http://java.sun.com
xsi:type="java:org.exolab.castor.mapping.MapItem">
<key xsi:type="java:java.lang.String">hi</key>
<value xsi:type="kns:NatLangRepresentation">
<theRepresentation> □□□ </theRepresentation>
</value>
</nlRepresentation>
</anObjectClass>
<anObjectClass itemName="CLS_en_coconut" xsi:type="ObjectClassItem">
<          nlRepresentation          xmlns:java=http://java.sun.com
xsi:type="java:org.exolab.castor.mapping.MapItem">
<key xsi:type="java:java.lang.String">en</key>
```

```
< value xsi:type="NatLangRepresentation">
<theRepresentation>coconut</theRepresentation>
</value>
</nlRepresentation>
</anObjectClass>
<anObjectClass itemName="CLS_en_friend" xsi:type="ObjectClassItem">
<           nlRepresentation          xmlns:java=http://java.sun.com
xsi:type="java:org.exolab.castor.mapping.MapItem">
<key xsi:type="java:java.lang.String">en</key>
<value xsi:type="NatLangRepresentation">
<theRepresentation>friend</theRepresentation>
</value>
</nlRepresentation>
</anObjectClass>
<anObjectClass itemName="CLS_en_woman" xsi:type="ObjectClassItem">
<           nlRepresentation          xmlns:java=http://java.sun.com
xsi:type="java:org.exolab.castor.mapping.MapItem">
<key xsi:type="java:java.lang.String">en</key>
<kns:value xsi:type="NatLangRepresentation">
<kns:theRepresentation>woman</kns:theRepresentation>
</kns:value>
</nlRepresentation>
</anObjectClass>
<anObjectClass itemName="CLS_en_man" xsi:type="ObjectClassItem">
<           nlRepresentation          xmlns:java=http://java.sun.com
xsi:type="java:org.exolab.castor.mapping.MapItem">
<key xsi:type="java:java.lang.String">en</key>
<kns:value xsi:type="NatLangRepresentation">
<kns:theRepresentation>man</kns:theRepresentation>
</kns:value>
</nlRepresentation>
<behaviour>
<actionClass>ACLS_en_marry</actionClass>
<actionObjectClass>CLS_en_woman</actionObjectClass>
</behaviour>
</anObjectClass>
<anObjectClass itemName="CLS_en_elephant" xsi:type="ObjectClassItem">
<nlRepresentation                      xmlns:java=http://java.sun.com
xsi:type="java:org.exolab.castor.mapping.MapItem">
<key xsi:type="java:java.lang.String">en</key>
<kns:value xsi:type="NatLangRepresentation">
<kns:theRepresentation>elephant</kns:theRepresentation>
</kns:value>
</nlRepresentation>
<nlRepresentation                      xmlns:java=http://java.sun.com
xsi:type="java:org.exolab.castor.mapping.MapItem">
<key xsi:type="java:java.lang.String">hi</key>
<value xsi:type="kns:NatLangRepresentation">
<theRepresentation> ☐☐☐ </theRepresentation>
</kns:value>
</nlRepresentation>
<behaviour>
<actionClass>CLS_en_eat</actionClass>
<actionObjectClass>CLS_en_plaintain</actionObjectClass>
<actionObjectClass>CLS_en_coconut</actionObjectClass>
</behaviour>
</anObjectClass>
<anObject itemName="OBJ_en_John" xsi:type="ObjectItem">
<nlRepresentation                      xmlns:java=http://java.sun.com
xsi:type="java:org.exolab.castor.mapping.MapItem">
<key xsi:type="java:java.lang.String">en</key>
<value xsi:type="NatLangRepresentation">
<theRepresentation>John</theRepresentation>
</value>
</nlRepresentation>
<objectClass>CLS_en_man</objectClass>
<attributeValue                        xmlns:java=http://java.sun.com
xsi:type="java:org.exolab.castor.mapping.MapItem">
<key xsi:type="AttributeItem">ATR_en_name</key>
<value xsi:type="ObjectItem">
<nlRepresentation                      xmlns:java=http://java.sun.com
xsi:type="java:org.exolab.castor.mapping.MapItem">
<key xsi:type="java:java.lang.String">en</key>
<value xsi:type="NatLangRepresentation">
<theRepresentation>John</theRepresentation>
</value>
</nlRepresentation>
</value>
</attributeValue>
```

```
</anObject>
<anObject itemName="OBJ_en_Mary" xsi:type="ObjectItem">
<nlRepresentation                              xmlns:java=http://java.sun.com
xsi:type="java:org.exolab.castor.mapping.MapItem">
<key xsi:type="java:java.lang.String">en</key>
<value xsi:type="NatLangRepresentation">
<theRepresentation>Mary</theRepresentation>
</value>
</nlRepresentation>
<objectClass>CLS_en_woman</objectClass>
<attributeValue                                xmlns:java=http://java.sun.com
xsi:type="java:org.exolab.castor.mapping.MapItem">
<key xsi:type="AttributeItem">ATR_en_name</key>
<value xsi:type="ObjectItem">
<nlRepresentation                              xmlns:java=http://java.sun.com
xsi:type="java:org.exolab.castor.mapping.MapItem">
<key xsi:type="java:java.lang.String">en</key>
<value xsi:type="NatLangRepresentation">
<theRepresentation>Mary</theRepresentation>
</value>
</nlRepresentation>
</value>
</attributeValue>
</anObject>
<anAction itemName="ACT_en_married_1" xsi:type="ActionItem">
nlRepresentation                               xmlns:java=http://java.sun.com
xsi:type="java:org.exolab.castor.mapping.MapItem"
<key xsi:type="java:java.lang.String">en</key>
<value xsi:type="NatLangRepresentation">
<kns:theRepresentation>married</kns:theRepresentation>
</value>
</nlRepresentation>
<actionClass>ACLS_en_marry</actionClass>
<actionDoer>OBJ_en_John</actionDoer>
<actionTarget>OBJ_en_Mary</actionTarget>
</anAction>
<anAction itemName="ACT_en_gave_1" xsi:type="ActionItem">
<nlRepresentation                              xmlns:java=http://java.sun.com
xsi:type="java:org.exolab.castor.mapping.MapItem">
<key xsi:type="java:java.lang.String">en</key>
<value xsi:type="NatLangRepresentation">
<theRepresentation>gave</kns:theRepresentation>
</value>
</nlRepresentation>
<actionClass>ACLS_en_give</actionClass>
<actionDoer>OBJ_en_Mary</actionDoer>
<actionConveyanceTarget      xsi:type="AnonymousObjectItem"        itemName="
OBJ_en_friend_1">
<objectClass>CLS_en_friend</objectClass>
</actionConveyanceTarget>
<actionConveyed xsi:type="AnonymousObjectItem" itemName="OBJ_en_book_1">
<objectClass>CLS_en_book</objectClass>
</actionConveyed>
</anAction>
</knowledgeNet>
```

In the above representation, the attribute with name "itemName" is an identity-attribute that uniquely identifies a semantic item and every value for this attribute is unique across the knowledgeNet.

To generate the English sentence for the semantic item with identity "CLS_en_elephant" In the above chunk of knowledge:
Firstly, for English,
  Word separator=THESPACE=' '
  Sentence terminator=THEPERIOD='.'
  List item delimiter=LISTITEM_DELIMITER=','
  List terminator=LIST_TERMINATOR="and"

Next note that its type (value for the "xsi:type" attribute) is 'ObjectClassItem', we further note that the semantic item has value for the 'behaviour' element, so we conclude that we need to generate a sentence of sentence type ClassBehaviourDescriptor. For ClassBehaviourDescriptor, from the sentence type to sentence part type map under the language model, we get SPT-set, the set of sentence part type needed and for each sentence part type, the vocabulary class and vocabulary class features needed.

Firstly the Set of sentence part types:
  SPT-set={SPT_DOER, SPT_ACTION, SPT_ACTION-TARGET}

Now for the vocabulary classes, (using the notation for procedure/function/method call in programming languages),
  DOER_VC=vcFor(SPT_DOER)=NOUN,
  ACTION_VC=vcFor(SPT_ACTION)=VERB,
  TARGET_VC=vcFor(SPT_ACTIONTARGET)=NOUN where vcFor( ) is a procedure/function/method available in the input natural language object, returning the vocabulary class for the sentence part type passed in.

For the relative vocabulary class feature sets we have, (using the notation for procedure/function/method call in programming languages), DOER_vcf=vcfFor(ClassBehaviourDescriptor, DOER_VC)={NOMINATIVECASE, PLURALNUMBER, ANYGENDER}

ACTION_vcf=vcfFor(ClassBehaviourDescriptor, ACTION_VC)={PRESENT_TENSE}

TARGET_vcf=vcfFor(ClassBehaviourDescriptor, TARGET_VC)=OBJECTIVECASE, PLURALNUMBER, ANYGENDER where vcfFor( ) is a procedure/function/method available in the input natural language object that returns the set of vocabulary class features for the vocabulary class and sentence type passed in.

Now for the map of sentence part type to the parts within ObjectClassItem (using the symbol '->' for "is mapped to" and the '.' symbol to access the inner contents of any semantic item, and the square-brackets to access the nth-item in a collection):

SPT_DOER->objClassItem=input instance of ObjectClassItem
SPT_ACTION->objClassItem.behaviour.actionClass
SPT_ACTIONTARGET->objClassItem.behaviour.actionObjectClass So, the actual semantic items for the various sentence part types:

SPT_DOER item=objClassItem
SPT_ACTION item=ACLS_en_eat
SPT_ACTIONTARGET item=CLS_en_plaintain Now for the root words for each of the sentence part types:

SPT_DOER_root=objClassItem.nlRepresentation("en").theRepresentation[0]
SPT_ACTION_root=ACLS_en_eat.nlRepresentation("en").theRepresentation[0]
SPT_ACTIONTARGET_root=
CLS_en_plantain.nlRepresentation("en").theRepresentation[0]

Now for the actual phrases for the various sentence part types:

SPT_DOER_phrase=wordFormFor(SPT_DOER_root, DOER_vcf)
SPT_ACTION_phrase=wordFormFor(SPT_ACTION_root, ACTION_vcf)
SPT_ACTIONTARGET_phrase=wordFormFor(APT_ACTIONTARGET_root, TARGET_vcf)

As the 'behaviour' item in the input semantic item contains multiple actionObjectClass items, a refinement is needed here. After constructing SPT_ACTIONTARGET_phrase for the first actionObjectClass item, an iteration is done as under:

```
while there are more actionObjectClass items {
If there is only one more actionObjectClass item {
Append LIST_TERMINATOR
    } else {
    Append LISTITEM_DELIMITER
    Append THESPACE
    }
    Append THESPACE
    Append SPT_ACTIONTARGET_phrase for the next
actionObjectClass item constructed as above
    }
    Now the phrase order in English for ClassbehaviourDescriptor is:
    SPT_DOER, SPT_ACTION, SPT_ACTIONTARGET
    So, using the '+' symbol for concatenation, we get the required
    sentence as: theSentence = SPT_DOER_phrase +
THESPACE + SPT_ACTION_phrase +
THESPACE + SPT_ACTIONTARGET_phrase + THEPERIOD =
"Elephants eat plantains and coconuts."
```

By way of a second example, consider the ActionItem ACT_en_married_1 in the knowledge-net described above. We note that we need to generate a sentence of sentence type ActionDescriptor.

For ActionDescriptor, from the sentence type to sentence part type map under the language model, we get SPT-set, the set of sentence part type needed and for each sentence part type, the vocabulary class and vocabulary class features needed.

Firstly the Set of sentence part types:
SPT-set={SPT_DOER, SPT_ACTION, SPT_ACTIONTARGET}

Now for the vocabulary classes, (using the notation for procedure/function/method call in programming languages),
DOER_VC=vcFor(SPT_DOER)=NOUN,
ACTION_VC=vcFor(SPT_ACTION)=VERB,
TARGET_VC=vcFor(SPT_ACTIONTARGET)=NOUN
where vcFor( ) is a procedure/function/method available in the input natural language object, returning the vocabulary class for the sentence part type passed in.

For the relative vocabulary class feature sets we have, (using the notation for procedure/function/method call in programming languages),
DOER_vcf=vcfFor(ActionDescriptor, DOER_VC)= {NOMINATIVECASE, ANYNUMBER, ANYGENDER}
ACTION_vcf=vcfFor(ActionDescriptor, ACTION_VC)= {PASTTTENSE}
TARGET_vcf=vcfFor(ActionDescriptor, TARGET_VC)= OBJECTIVECASE, ANYNUMBER, ANYGENDER where vcfFor( ) is a procedure/function/method available in the input natural language object that returns the set of vocabulary class features for the vocabulary class and sentence type passed in.

Now for the map of sentence part type to the parts within Actionitem (using the symbol '->' for "is mapped to" and the '.' symbol to access the inner contents of any semantic item, and the square-brackets to access the nth-item in a collection):

SPT_DOER->actionitem.actionDoer, where actionitem=input instance of Actionitem
SPT_ACTION->actionItem.actionClass
SPT_ACTIONTARGET->actionitem.actionTarget So, the actual semantic items for the various sentence part types:
SPT_DOER item=OBJ_en_John
SPT_ACTION item=ACLS_en_marry
SPT_ACTIONTARGET item=OBJ_en_Mary Now for the root words for each of the sentence part types:
SPT_DOER_root=OBJ_en_John.nlRepresentation ("en"). theRepresentation[0]
SPT_ACTION_root=ACLS_en_marry.nlRepresentation ("en").theRepresentation[0]
SPT_ACTIONTARGET_root=OBJ_en_Mary.nlRepresentation("en").theRepresentation[0]

Now for the actual phrases for the various sentence part types:
SPT_DOER_phrase=wordFormFor(SPT_DOER_root, DOER_vcf)
SPT_ACTION_phrase=wordFormFor(SPT_ACTION_root, ACTION_vcf)
SPT_ACTIONTARGET_phrase=wordFormFor(APT_ACTIONTARGET_root, TARGET_vcf)

Now the phrase order in English for ActionDescriptor is: SPT_DOER, SPT_ACTION, SPT_ACTIONTARGET So, using the '+' symbol for concatenation, we get the required sentence as:

theSentence=SPT_DOER_phrase+THESPACE+SPT_ACTION_phrase+THESPACE+SPT_ACTIONTARGET_phrase+THEPERIOD="John married Mary."

It is possible to generate text for questions also. The need for questions to be generated arises in various contexts. One of the contexts is when a gap is identified in the knowledge. Asking questions is fundamental to learning.

It is to be first noted that in the utterance hierarchy, there is a comprehensive branch under 'Question', just as under 'Proposition'. Noting that the semantics related to space and time are fundamental, further that location in time and space are fundamental attributes of objects and actions, absence of these information items in object and action semantic items can straightaway lead to LocationQuestion and ActionTimeQuestion. Absence of information about doer of an action item gives rise to an ActionDoerQuestion whereas absence of information about the target or object of an action can lead to an ActionTargetQuestion. When it is already known that an object class or an action class is associated with a certain attribute, if an object belonging to such object class or an action belonging to such action class has no value for the said attribute, then there is a case for an ObjectAttributeQuestion or an ActionAttributeQuestion. If we have an instance of an ObjectClassItem that does not contain a 'behaviour' element, or if the behaviour-element is incomplete (for example if the actionTarget item is absent within the 'behaviour' element, then there is a case for a ClassBehaviourQuestion. The data-structures, algorithm and method for generation of questions are broadly the same as for generating proposition utterances already described in detail. The sentence part types for questions would be slightly different from the sentence part types for similar propositions. For example, we would have a sentence part type SPT_UNKNOWNDOER for an ActionDoerQuestion, instead of the SPT_DOER needed for an ActionDescriptor proposition; we would have a sentence part type denoted by SPT_UNKNOWNLOCATION under a LocationQuestion and a sentence part type denoted by SPT_UNKNOWNTIME under an ActionTimeQuestion.

When the input set of semantic items contains two or more action items, an interesting possibility arises: two such actions may be sharing an object. Such sharing can occur in multiple ways. For example, the doer in the first action may be a doer or a target-object in the second action; the target-object in the first action may be a doer or a target-object in the second action. In such situations, straightforward application of the algorithm afore described is fine, but will lead to two independent sentences. TGS, however, facilitates economy of expression by supporting the generation of a single complex sentence based on the sharing of an object—the main clause to represent the I-action and the subordinate clause to represent the II-action. To this end, TGS formalizes the possibilities by using separate constructs for each: DOER_FROM_DOER (doer-item in I-action is same as doer-item in II-action), DOER_FROM_TARGET (doer-item in I-action same as target-item in II-action), TARGET_FROM_DOER (target-item in I-action same as doer-item in II-action) and TARGET_FROM_TARGET (target-item in I-action same as target-item in II-action).

The algorithm to generate text for a single sentence for two actions sharing an object is a refinement of the algorithm described earlier. This refinement is described hereunder:

a. Query the language object to obtain the mechanism used by the language to establish shared object linkage: the mechanism may use of a connector word, as in English, or morphed action-verb, as in Kannada.
  1. If the language is using connector word, query the language object to obtain the connector-word for the applicable construct (DOER_FROM_DOER/DOER_FROM_TARGET/TARGET_FROM_DOER/TARGET_FROM_TARGET)
  2. If the language is using morphed action-verb, query the language object to obtain the morphing rules for the applicable construct (DOER_FROM_DOER/DOER_FROM_TARGET/TARGET_FROM_DOER/ TARGET_FROM_TARGET)
b. Query the language object for the complex-sentence to sentence part types association rules; these rules also reflect the mechanism used by the language to establish shared object linkage: if a connector is being used, a sentence part type SPT_OBJECT_SHARING_CONNECTOR will figure in the association rule; if a morphed action-verb is being used, a sentence part type SPT_OBJECT_SHARING_MORPHED_ACTION will figure in the associated rule.

The disclosed technology has potential for use in the following:

1. Machine Translation of text in one natural language to another natural language: the translation exercise is preceded by reading and knowledge building. The earlier, associated invention LPKBS (Language Processing and Knowledge Building System) builds the knowledge-net consisting of semantic items representing the extracted knowledge. In that process, the LPKBS would have first constructed one or more natural language utterance object(s) (an instance of a class in the natural language utterance hierarchy) for each sentence in the natural language text read. In an embodiment designed to assist translation, the LPKBS outputs the set of natural language utterance objects, each of which is also populated with the semantic items corresponding to the various parts of the utterance. Those natural language utterance objects can be directly used in generating the text in the target language for the translation, obviating the need for step 1 and simplifying step 3 (described on page 39 and 40) in the text generation method.

2. Abstractive summarization: progress in this area has been hampered by limitations in both extraction of semantics from natural language text and in robust natural language text generation. This invention addresses the latter limitation, while the earlier, associated invention LPKBS (Language Processing and Knowledge Building System), with its semantic focus, addresses the former limitation. It is hoped to make significant breakthrough in abstractive summarization. In fact, this inventor has already applied LPKBS and TGS in proof-of-concept implementations of abstractive summarization of court judgment documents.

3. Conversation agents and chat-bots: Currently, conversation agents and chat-bots use human-created, domain-specific, marked-up content for identifying the content of the outward communication and domain and content specific templates for building the text for the outward communication. The current invention facilitates domain-independent, template-less construction of the text for the outward communication. The earlier, associated invention LPKBS (Language Processing and Knowledge Building System), with its semantic focus, facilitates building up comprehensive domain knowledge by reading domain related text documents in supported natural languages and therefore helps do away with the expensive human effort to create content for outward communication.

4. Question Answering Systems: the TGS can be used in constructing the natural language text for the answer, without relying on pre-built templates, and hence saving the effort and cost on maintaining such templates.

5. Human-in-the-loop AI Systems: the TGS can be used to construct a small set of proper natural language sentences that describes the context and action/help needed from the human-in-the-loop. This will facilitate quicker response from such human-in-the-loop. The ability to generate proper text for questions is a powerful facilitator for systems that can learn by interacting with humans.

6. The question generation capability provides a big step towards natural language interfaces for computing in general.

7. The LPKBS and TGS systems in tandem facilitate what may be called "Open Ontology Systems". Typical business software are closed ontology systems: the domain and enterprise ontology are baked into the system at development time, and such ontology cannot be changed or extended by the end users at run time—only objects conforming to the ontology can be added or manipulated at run time. A computing platform empowered by LPKBS and TGS can start with a clean slate, continually develop the ontology needed by any business by reading domain text and maintain business data through a natural language interface. For example, if the platform has read and built knowledge about customers, products, orders and sales, then the following is a feasible scenario: user says "we have received a new order."; system asks "who is the customer?"; user responds; system asks "what are the items?"; user responds; system builds and stores an order. This possibility, when developed to full potential, can render business software development entirely redundant.

Hence, system and method for natural language generation disclosed in the present disclosure, advances the state of the art in natural language generation technology and the above application areas.

While specific language has been used to describe the invention, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

What is claimed is:

1. A system for generating a text based on one or more semantic items from a knowledge repository, the system comprising:
    a processor;
    a memory that is communicatively coupled to the processor, wherein the memory comprises a repository of language objects for natural languages supported by the system; and
    a program stored in the memory for execution by the processor, the program configured for:
        receiving one or more semantic items and a language object corresponding to a language in which the text is to be generated, wherein the one or more semantic items is from a knowledge repository and wherein the language object is from a language object repository, wherein the one or more semantic items conform to a comprehensive knowledge representation format, and the language object conforms to a comprehensive language template, and wherein the one or more semantic items comprise structural content and attributes;
        identifying one or more sentence types for each received semantic item, based on a subtype of the semantic item and a structural content of the semantic item;
        identifying one or more sentence part types for the each identified sentence type, by querying the sentence type to sentence part type mappings in the language object;
        obtaining a vocabulary class for the each identified sentence part type by querying a word to sentence part type association rule;
        obtaining one or more vocabulary class features for each of the sentence part types by querying the word to sentence part type association rule;
        identifying, for each identified sentence part type, the corresponding one or more semantic items, either contained within the said each received semantic item or connected to the said each received semantic item;
        creating a natural language phrase object to be used in the text to be generated, for the each sentence part type;
        fully building the each created natural language phrase object using the structural content and attributes of the identified semantic item or items;
        deriving an expression for the each built natural language phrase object as a word form or a sequence of multiple words, appropriate for the identified vocabulary class and vocabulary class features, using one or more root words for the semantic items in the language to be used for text generation;
        applying the deriving step recursively for components of the natural language phrase objects;
        arranging sequentially the derived expressions using a word separation character, provided by the language object, between every pair of successive expressions, in an order dictated by the position in sentence value in a wordFeatureValueSet for the sentence part type within the word to sentence part type association rule, to generate one or more sentences;
        appending an appropriate sentence termination character, as read from the language object.

2. The system of claim 1, wherein the each received semantic item may contain within itself connections to other semantic items in the knowledge repository and such other semantic items are referred to as connected semantic items.

3. The system of claim 2, wherein for each semantic item to be used in building a created phrase object, the system reads the root word corresponding to the received language object.

4. The system of claim 1, wherein for each identified sentence type, the system identifies the connected semantic items to be used in text generation, and, on the other, any of the sentence part types needed, which may have been, in part or whole, redefined in the language object, and the sequence, if any, in which those sentence part types should appear, predefined in the language object.

5. The system of claim 4, wherein the system generates the text for the identified sentence type by integrating the sequence of multiple words using the word separation character, predefined in the received language object, between every pair of successive word sequences.

6. The system of claim 1, wherein the system uses the root word and builds the word form corresponding to the identified vocabulary class and vocabulary class features.

7. The system of claim 1, wherein deriving the word form by starting with the root word under the input language object, which is a value for ISO code of the input language object in an expressions map within the identified one or more corresponding semantic items, and using the mechanisms available in the input language object to achieve or realize the obtained vocabulary class features.

8. A method for generating text using one or more semantic items from a knowledge repository, the method comprising the steps of:
receiving one or more semantic items and a language object corresponding to a language in which the text is to be generated, wherein the one or more semantic items is from a knowledge repository and wherein the language object is from a language object repository, wherein the one or more semantic items conform to a comprehensive knowledge representation format, and the language object conforms to a comprehensive language template, and wherein the one or more semantic items comprise structural content and attributes;
identifying one or more sentence types for each received semantic item, based on a subtype of the semantic item and a structural content of the semantic item;
identifying one or more sentence part types for the each identified sentence type, by querying the sentence type to sentence part type mappings in the language object;
obtaining a vocabulary class for the each identified sentence part type by querying a word to sentence part type association rules;
obtaining one or more vocabulary class features for each of the sentence part type by querying the word to sentence part type association rule;
identifying, for each identified sentence part type, the corresponding one or more semantic items, either contained within the said each received semantic item or related to the said each received semantic item;
creating a natural language phrase object to be used in the text to be generated, for the each sentence part type;
fully building the each created natural language phrase object using the structural content and attributes of the identified semantic item or items;
deriving an expression for the each built natural language phrase object as a word form or a sequence of multiple words, appropriate for the identified vocabulary class and vocabulary class features, using one or more root words for the semantic items in the language to be used for text generation;
applying the deriving step recursively for components of the natural language phrase objects;
arranging sequentially the derived expressions using a word separation character, provided by the language object, between every pair of successive expressions, in an order dictated by the position in sentence value in a wordFeatureValueSet for the sentence part type within the word to sentence part type association rule, to generate one or more sentences;
appending an appropriate sentence termination character, as read from the language object.

9. The method of claim 8, wherein the each received semantic item may contain within itself connections to other semantic items in the knowledge repository and such other semantic items are referred to as connected semantic items.

10. The method of claim 9, wherein for each semantic item to be used in building the created phrase object, the method reads the root word corresponding to the received language object.

11. The method of claim 8, wherein for each identified sentence type, the method identifies the connected semantic items to be used in text generation, and, on the other, any of the sentence part types needed, which may have been, in part or whole, redefined in the language object, and the sequence, if any, in which those sentence part types should appear, predefined in the language object.

12. The method of claim 11, wherein the method for text generation generates the text for the identified sentence type by integrating the sequence of multiple words using the word separation character, predefined in the received language object, between every pair of successive word sequences.

13. The method of claim 8, wherein the method uses the root word and builds the word form corresponding to the identified vocabulary class and vocabulary class features.

14. The method of claim 8, wherein deriving the word form by starting with the root word under the input language object, which is the value for ISO code of the input language object in an expressions map within the identified one or more corresponding semantic items, and using the mechanisms available in the input language object to achieve or realize the obtained vocabulary class features.

* * * * *